(12) United States Patent
Nishida

(10) Patent No.: US 11,045,009 B2
(45) Date of Patent: Jun. 29, 2021

(54) CUSHION WITH PROJECTOR SCREEN AND BED WITH PROJECTOR SCREEN

(71) Applicant: NETAPPLI CO., LTD., Ishikawa (JP)

(72) Inventor: Makoto Nishida, Ishikawa (JP)

(73) Assignee: NETAPPLI CO., LTD., Ishikawa (JP)

( * ) Notice: Subject to any disclaimer, the term of this patent is extended or adjusted under 35 U.S.C. 154(b) by 326 days.

(21) Appl. No.: 16/068,335

(22) PCT Filed: Jan. 9, 2017

(86) PCT No.: PCT/JP2017/000354
§ 371 (c)(1),
(2) Date: Jul. 5, 2018

(87) PCT Pub. No.: WO2017/122599
PCT Pub. Date: Jul. 20, 2017

(65) Prior Publication Data
US 2019/0014912 A1    Jan. 17, 2019

(30) Foreign Application Priority Data

Jan. 11, 2016  (JP) .............................. JP2016-003106
Sep. 13, 2016  (JP) .............................. JP2016-178327

(51) Int. Cl.
*A47C 21/00* (2006.01)
*G03B 21/62* (2014.01)
(Continued)

(52) U.S. Cl.
CPC ............ *A47C 21/003* (2013.01); *A47C 19/02* (2013.01); *G03B 21/10* (2013.01); *G03B 21/28* (2013.01);
(Continued)

(58) Field of Classification Search
CPC ...... A47G 9/10; A47G 9/1009; A47G 9/1018; A47G 9/1027; A47G 9/1036;
(Continued)

(56) References Cited

U.S. PATENT DOCUMENTS 2,107,962 A * 2/1938 Sheasby ............... A47C 20/047
                                                              5/638
2,551,727 A * 5/1951 Costello ................. A47C 16/00
                                                              5/638
(Continued)

FOREIGN PATENT DOCUMENTS

JP   H0560353 A   3/1993
JP   H0560353 U   8/1993
(Continued)

OTHER PUBLICATIONS

International Search Report (ISR) dated Feb. 21, 2017, issued for International application No. PCT/JP2017/000354.

*Primary Examiner* — Nicholas F Polito
*Assistant Examiner* — Morgan J McClure
(74) *Attorney, Agent, or Firm* — Law Office of Katsuhiro Arai

(57) ABSTRACT

In an embodiment, a cushion with projector screen 1 includes: a cushion main body 10 which is hollow and filled with air or light-transmissive fluid 11 inside; a first transmission-type screen layer 20 placed at the top part of the cushion main body; and a first reflector mirror 30 placed inside the cushion main body below the first transmission-type screen layer to reflect the light projected from a first projector P1 and project it onto the first transmission-type screen layer; wherein the cushion main body has a transparent part 14 that transmits the light from the first projector therethrough; and a user U lying face down on the cushion (Continued)

main body views the images projected onto the first transmission-type screen layer through the transparent part.

14 Claims, 15 Drawing Sheets

(51) Int. Cl.
   *G03B 21/28* (2006.01)
   *G03B 21/10* (2006.01)
   *G03B 29/00* (2021.01)
   *A47C 19/02* (2006.01)
   *A47G 9/10* (2006.01)

(52) U.S. Cl.
   CPC ............ *G03B 21/62* (2013.01); *G03B 29/00* (2013.01); *A47G 9/10* (2013.01); *A47G 9/109* (2013.01); *A47G 9/1054* (2013.01); *A47G 9/1063* (2013.01)

(58) Field of Classification Search
   CPC .. A47G 9/1045; A47G 9/1054; A47G 9/1063; A47G 9/1072; A47G 9/1081; A47G 9/109; G03B 21/10; G03B 21/12; G03B 21/62; G03B 21/28; G03B 29/00; A47C 19/02; A47C 21/003
   See application file for complete search history.

(56) References Cited

U.S. PATENT DOCUMENTS

| | | | | |
|---|---|---|---|---|
| 3,897,102 | A * | 7/1975 | Lemaire | A47C 1/143 5/656 |
| 4,639,106 | A * | 1/1987 | Gradin | G03B 21/00 348/E5.143 |
| 5,160,951 | A * | 11/1992 | Lander | G03B 21/10 353/119 |
| 5,349,400 | A * | 9/1994 | Kaplan | G03B 21/10 353/119 |
| D414,974 | S * | 10/1999 | Marrone, II | 5/638 |
| 6,142,844 | A * | 11/2000 | Klauber | B63C 11/49 441/129 |
| 6,860,567 | B1 * | 3/2005 | Bauer | A47C 1/143 297/144 |
| 6,938,287 | B1 * | 9/2005 | Mahshie | A47C 17/66 297/900 |
| 7,551,100 | B1 * | 6/2009 | Salley | A47D 9/02 340/691.1 |
| 7,788,751 | B1 * | 9/2010 | Diemer | A47C 16/00 5/644 |
| 8,561,959 | B2 * | 10/2013 | Matsuoka | F16M 11/2028 248/447.1 |
| 8,607,388 | B1 * | 12/2013 | Flanagan | A61G 7/0514 5/658 |
| 8,636,318 | B2 * | 1/2014 | Newsome | A47B 83/04 297/188.08 |
| 8,708,406 | B1 * | 4/2014 | Powell | A47C 21/00 297/188.06 |
| 8,925,721 | B2 * | 1/2015 | Young | A45C 11/00 206/320 |
| 9,131,792 | B1 * | 9/2015 | Wagner | A47C 20/026 |
| 10,042,478 | B2 * | 8/2018 | Capps | G03B 17/54 |
| D859,034 | S * | 9/2019 | Li | D6/604 |
| 10,537,193 | B1 * | 1/2020 | Cayler | A47C 16/00 |
| 10,613,422 | B2 * | 4/2020 | Sue | G03B 21/62 |
| 10,656,893 | B2 * | 5/2020 | Ono | G09G 5/14 |
| 2004/0134133 | A1 * | 7/2004 | Busby | A47C 27/087 52/2.11 |
| 2008/0244834 | A1 * | 10/2008 | McClintock | A47C 27/082 5/694 |
| 2008/0289110 | A1 * | 11/2008 | Duterte, Jr. | A47C 16/00 5/655.3 |
| 2008/0303318 | A1 * | 12/2008 | Hamilton | A47C 7/383 297/129 |
| 2009/0177327 | A1 * | 7/2009 | Turner | A47C 21/003 700/275 |
| 2012/0198614 | A1 * | 8/2012 | Aiken | A47D 15/00 5/93.1 |
| 2013/0276236 | A1 * | 10/2013 | Rasmussen | A47G 9/1027 5/640 |
| 2013/0312192 | A1 * | 11/2013 | Lee | A47G 9/007 5/639 |
| 2015/0107025 | A1 * | 4/2015 | Dauphin | A47C 16/00 5/638 |
| 2015/0342377 | A1 * | 12/2015 | Hall | A47G 9/1045 345/156 |
| 2016/0066717 | A1 * | 3/2016 | Schneider | G06F 1/1656 5/639 |
| 2016/0324343 | A1 * | 11/2016 | Sherwin | B32B 5/18 |
| 2019/0184132 | A1 * | 6/2019 | Nishida | A47G 9/1054 |
| 2019/0282007 | A1 * | 9/2019 | Wagner | A47C 16/00 |

FOREIGN PATENT DOCUMENTS

| | | |
|---|---|---|
| JP | H0678895 U | 11/1994 |
| JP | 2002355127 A | 12/2002 |
| JP | 2003015225 A | 1/2003 |
| JP | 2004516521 A | 6/2004 |
| WO | 0251142 A1 | 6/2002 |

* cited by examiner

[FIG. 1]
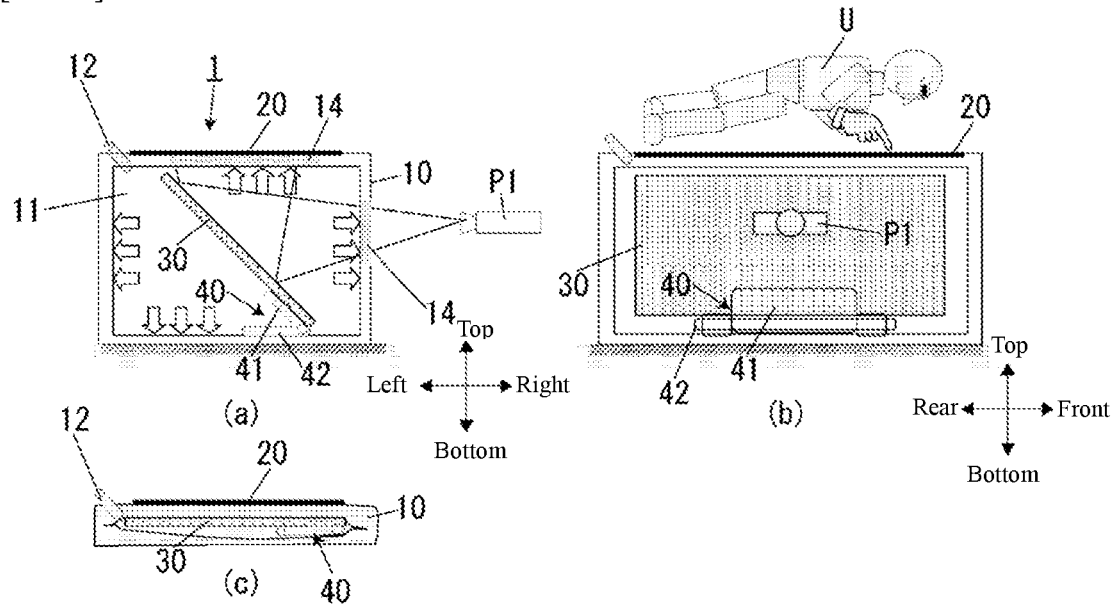
[FIG. 2]
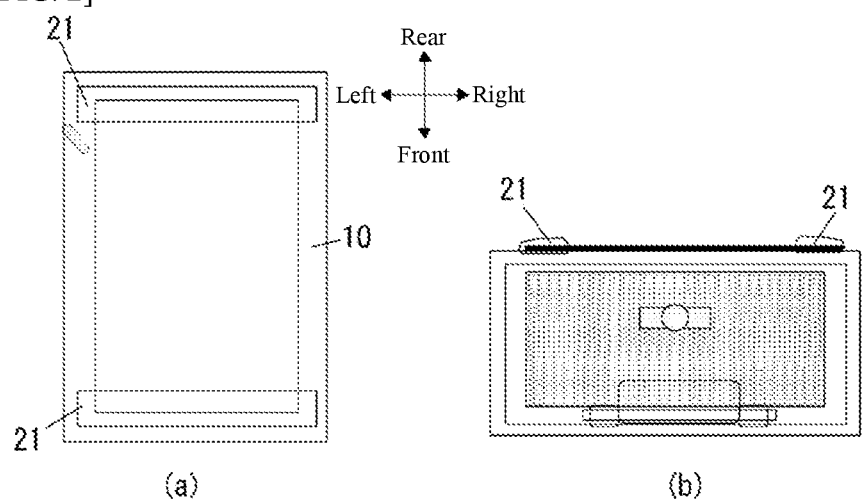
[FIG. 3]
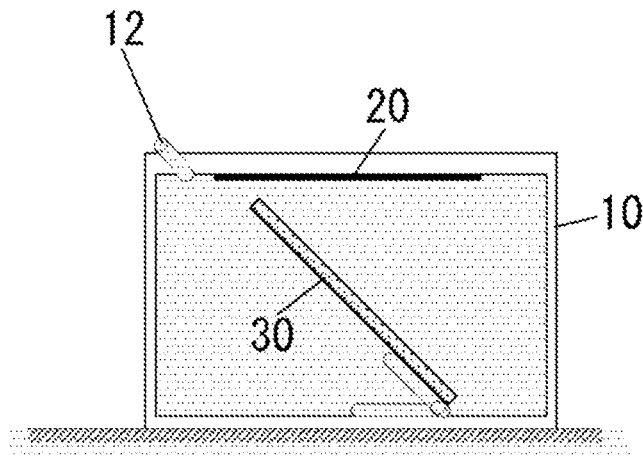

[FIG. 4]
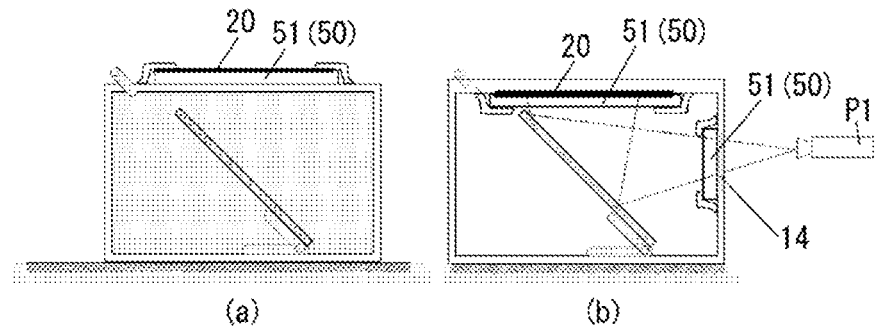
[FIG. 5]
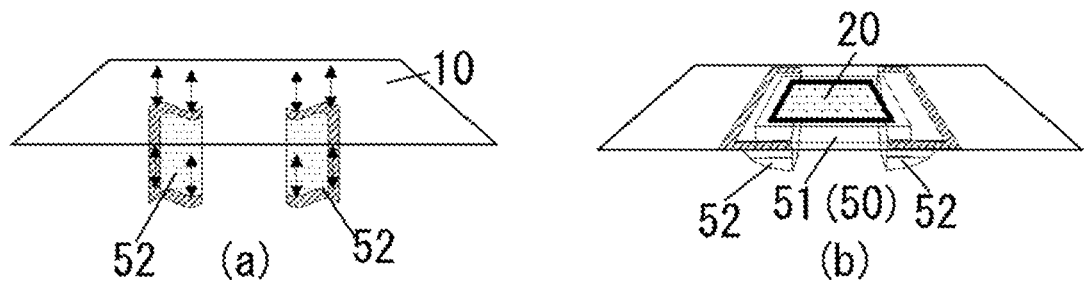
[FIG. 6]
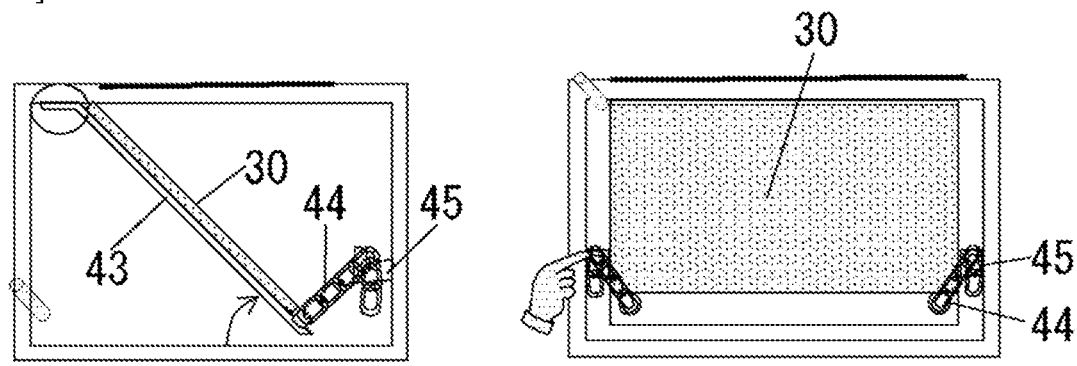
[FIG. 7]
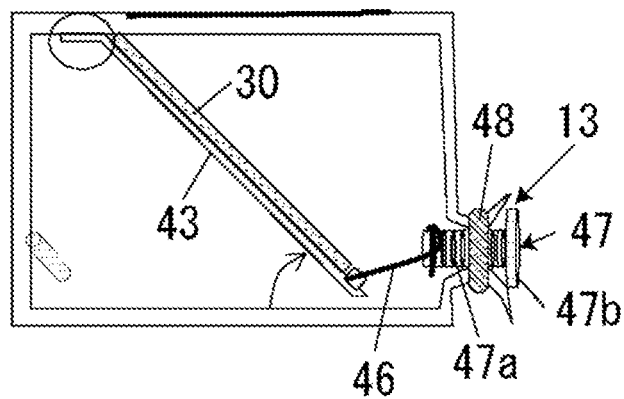

[FIG. 8]
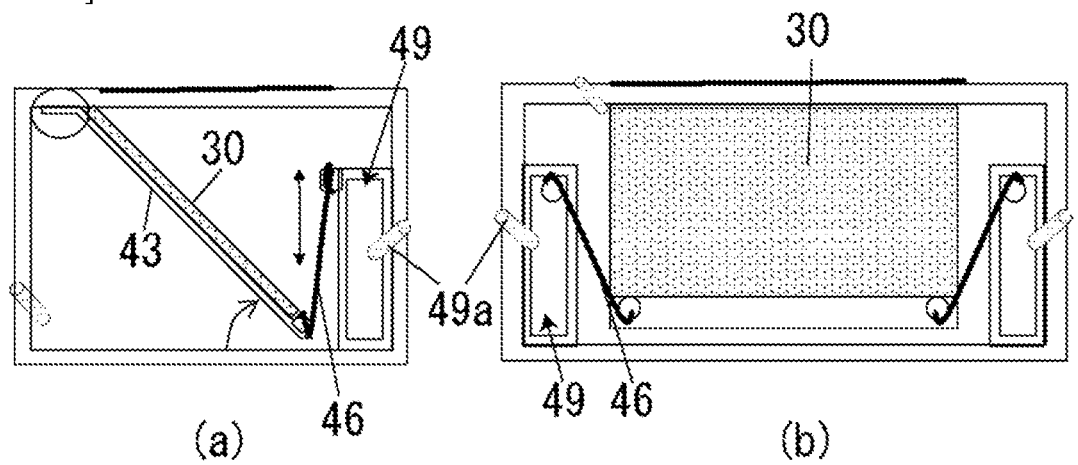
(a)  (b)
[FIG. 9]
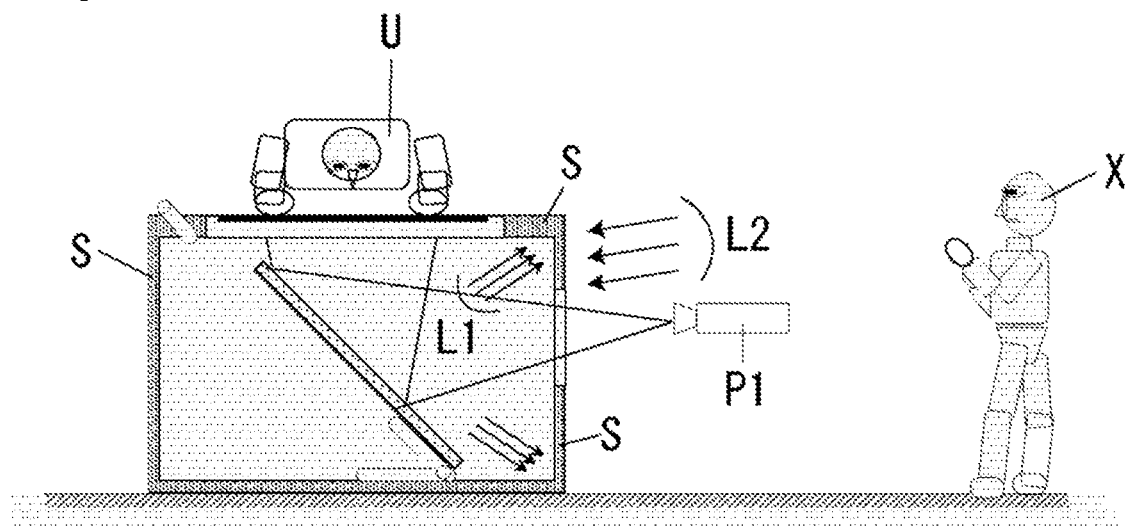

[FIG. 10]
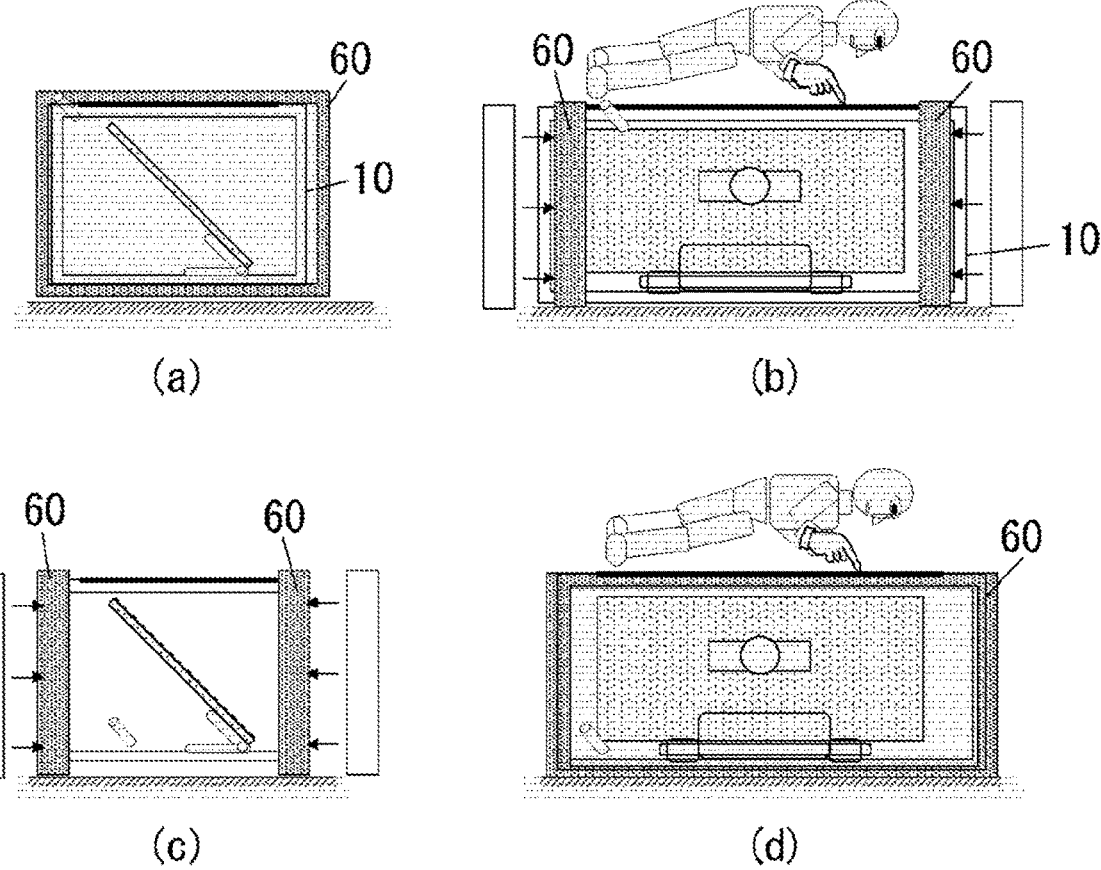
(a) (b) (c) (d)
[FIG. 11]
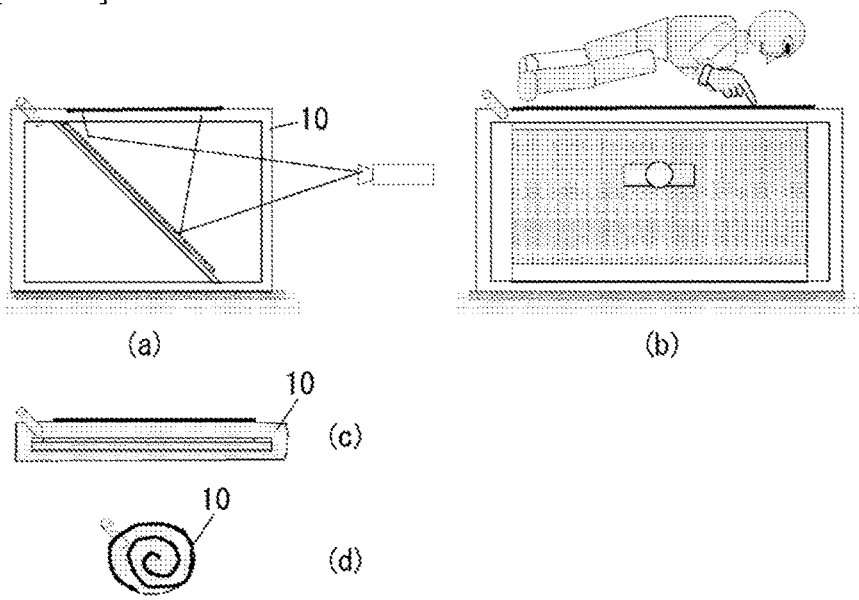
(a) (b) (c) (d)

[FIG. 12]
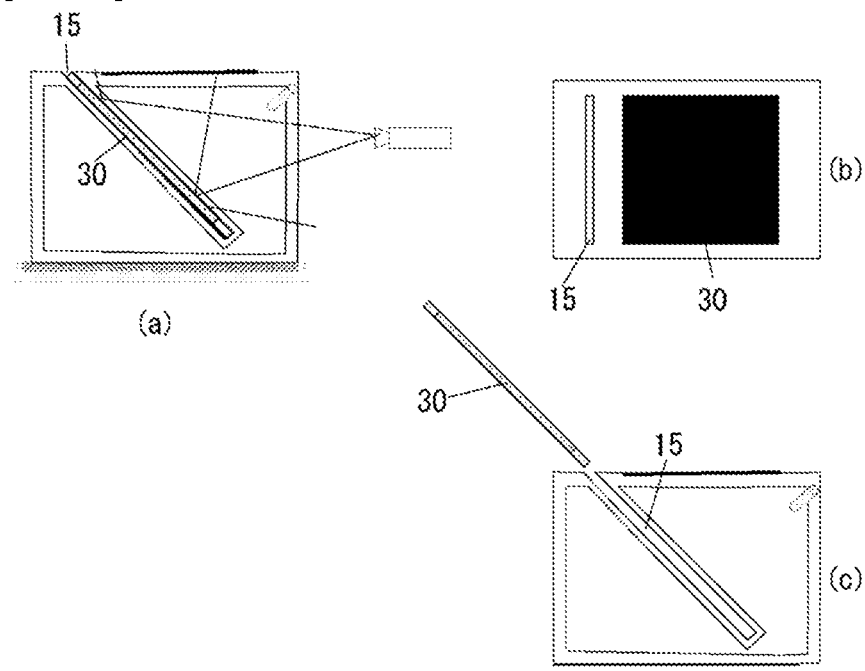
[FIG. 13]
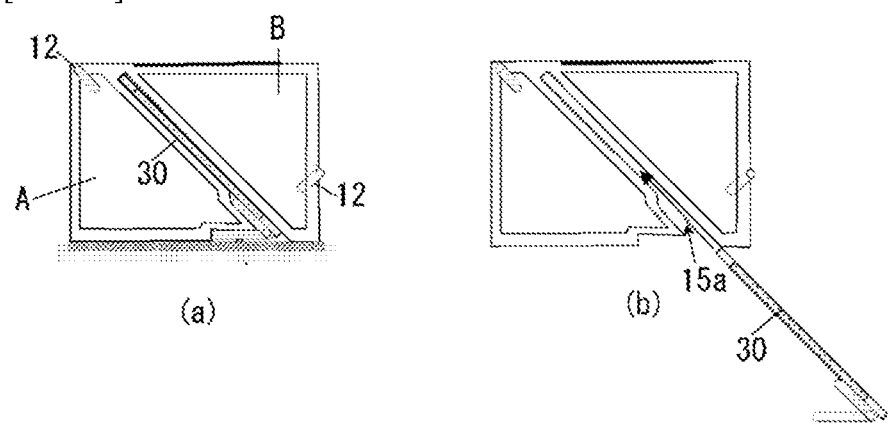

[FIG. 14]
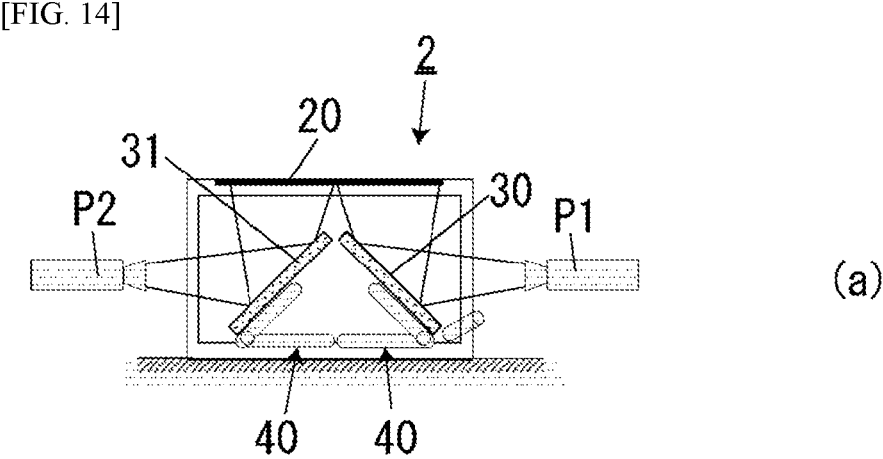
(a)
(b)
[FIG. 15]
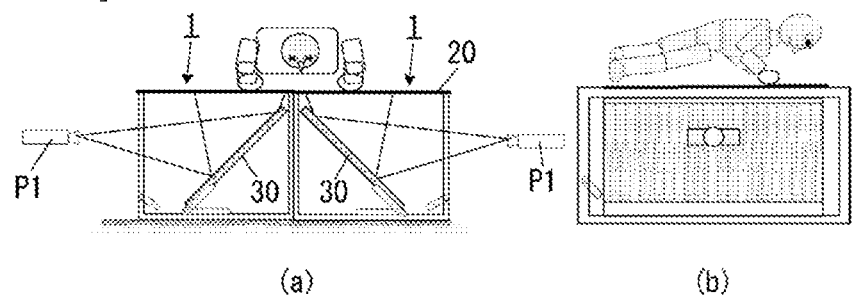
(a) (b)

[FIG. 16]
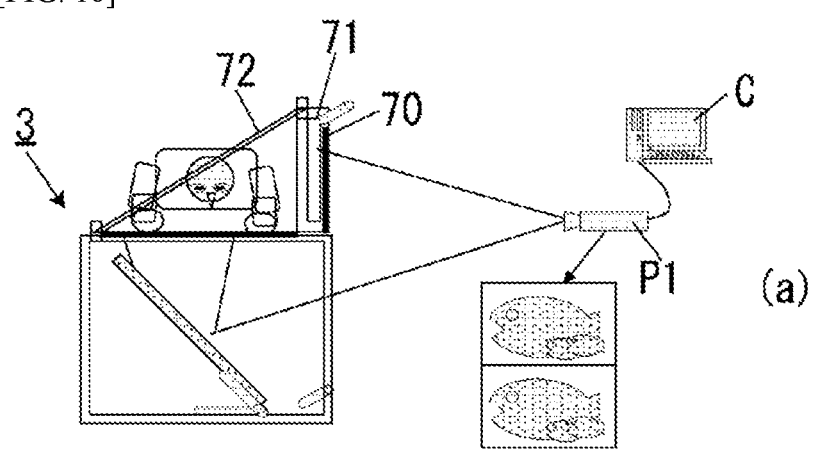
(a)
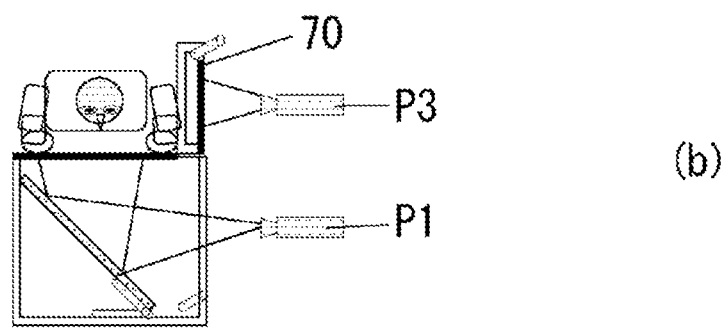
(b)

[FIG. 17]
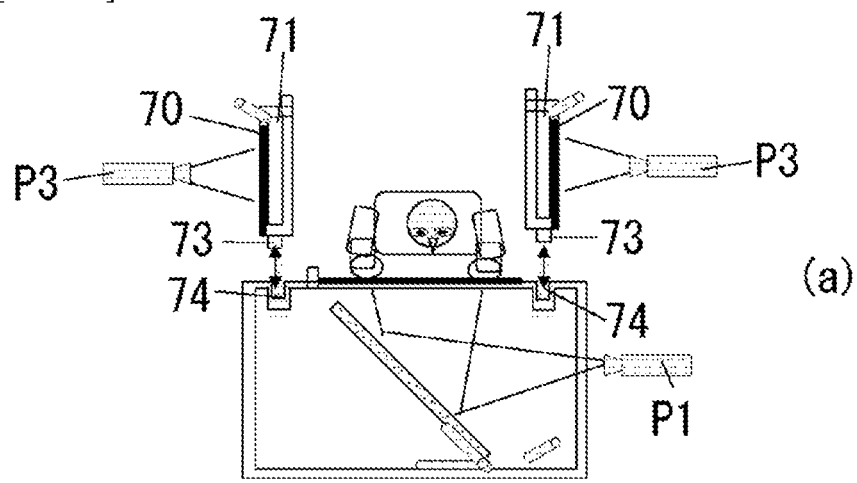
[FIG. 18]
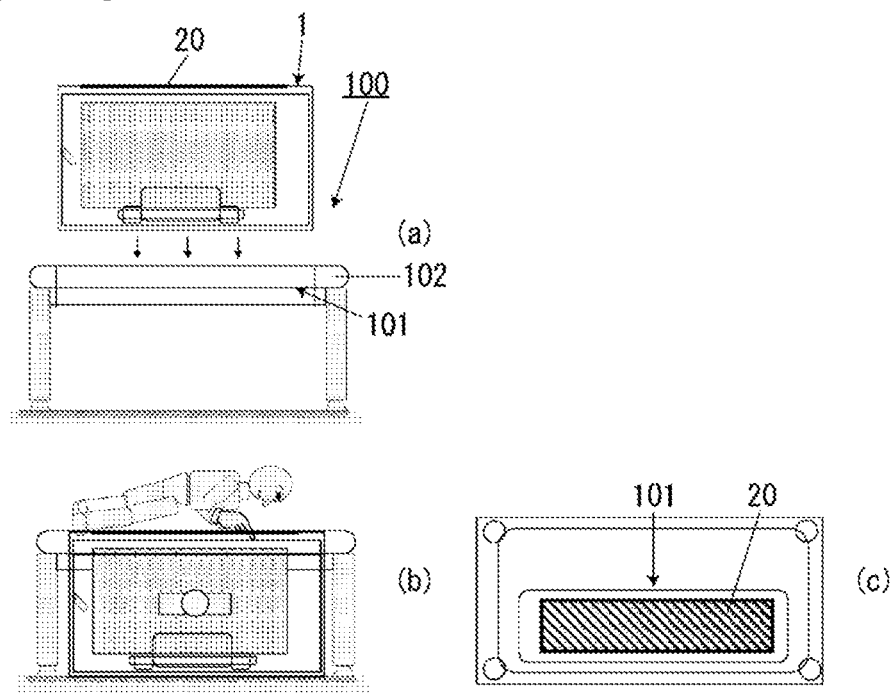

[FIG. 19]
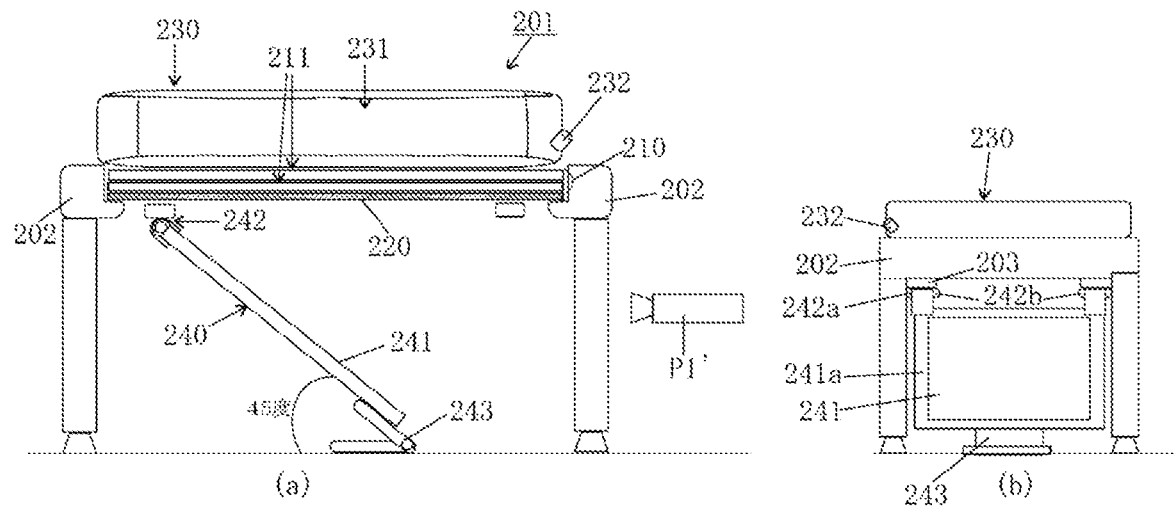
[FIG. 20]
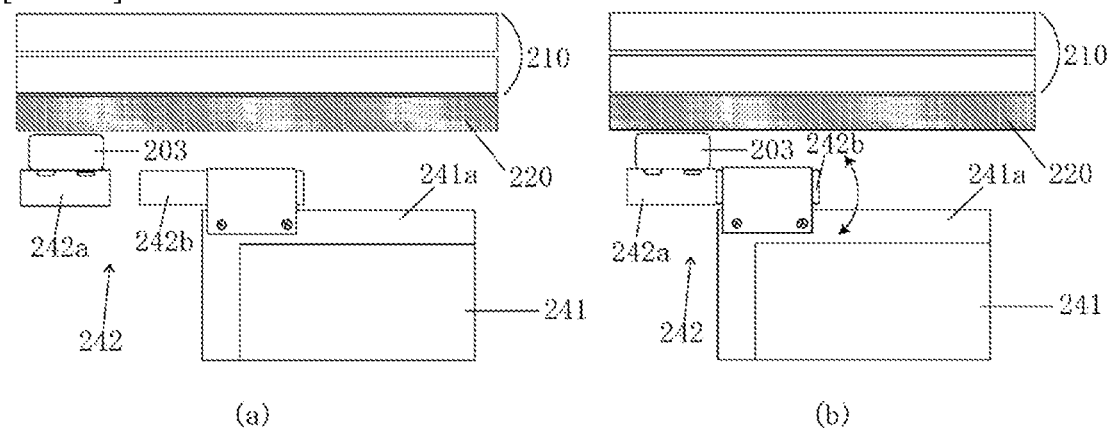
[FIG. 21]
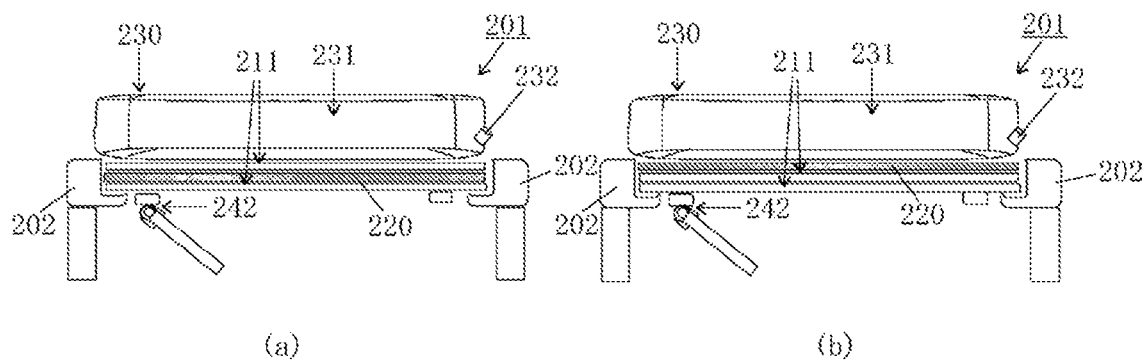

[FIG. 22]
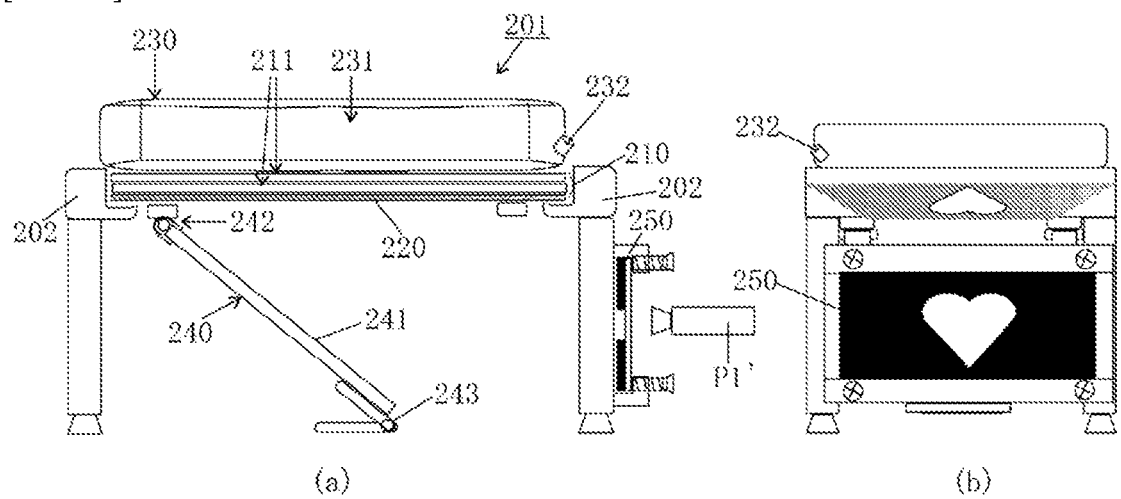
(a) (b)
[FIG. 23]
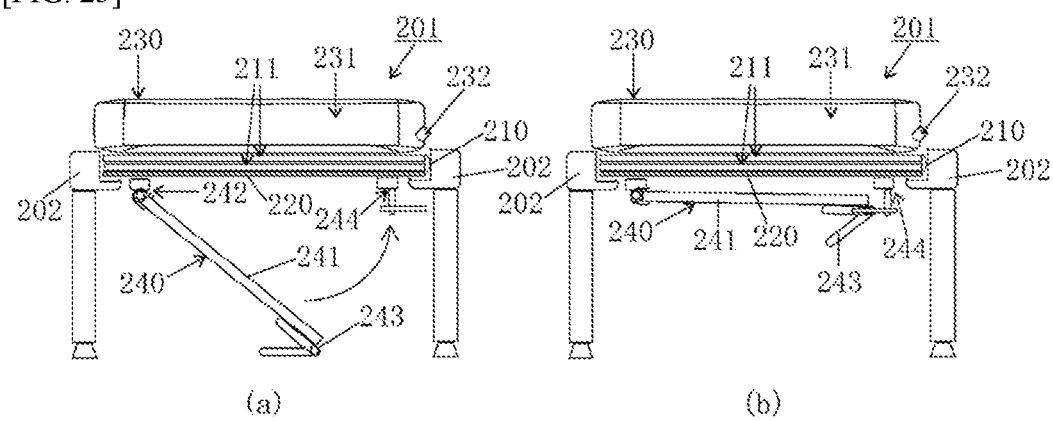
(a) (b)
[FIG. 24]
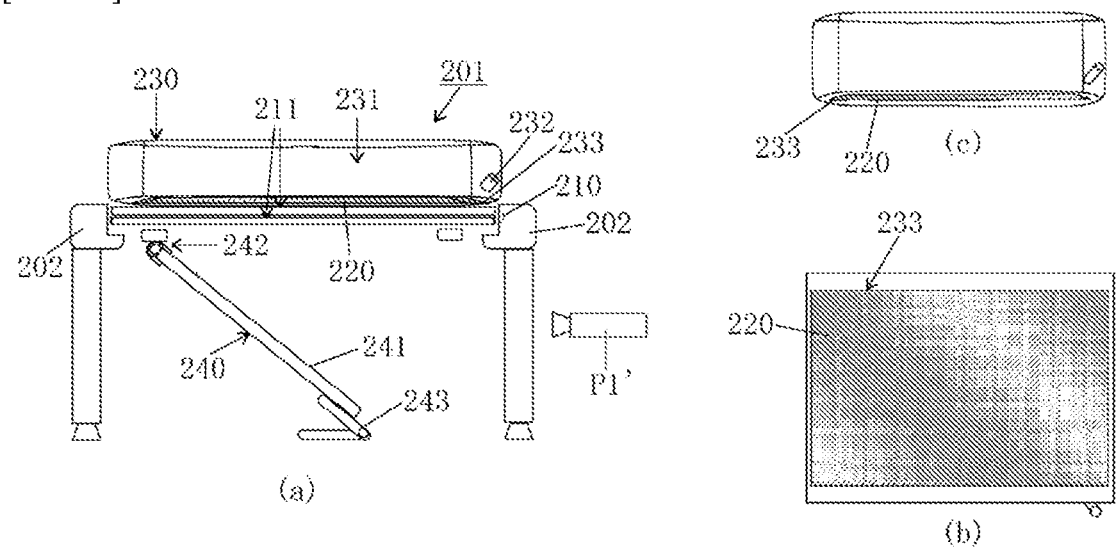
(a) (b)

[FIG. 25]
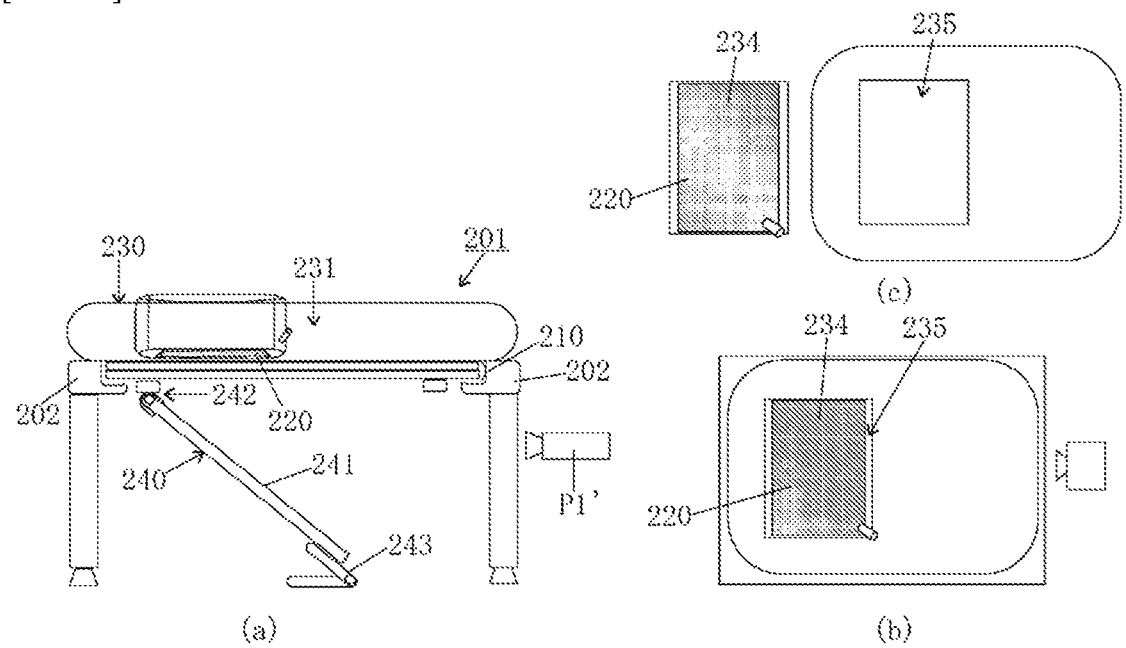
[FIG. 26]
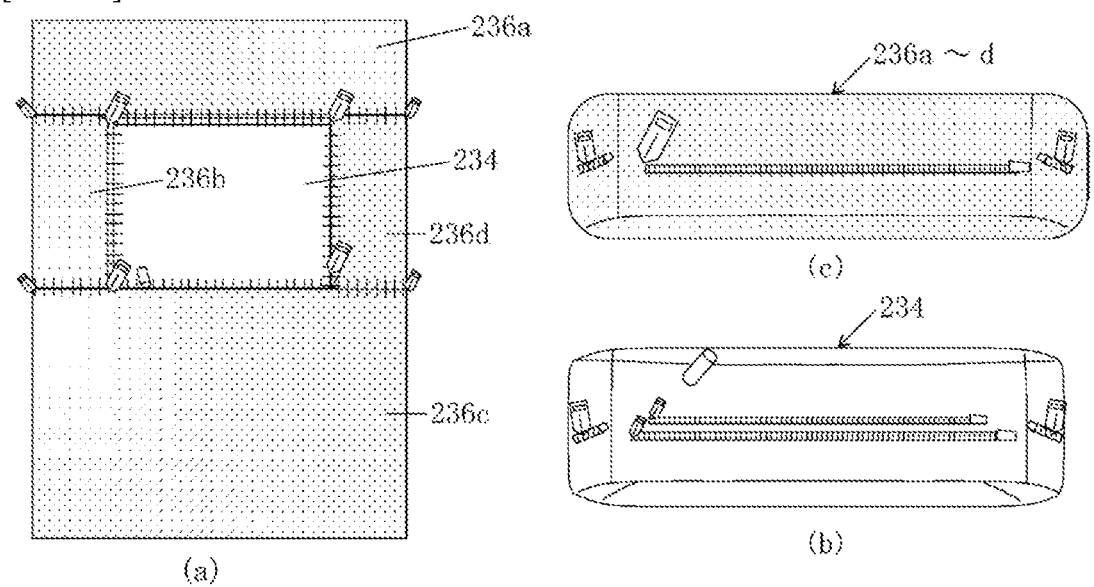

[FIG. 27]
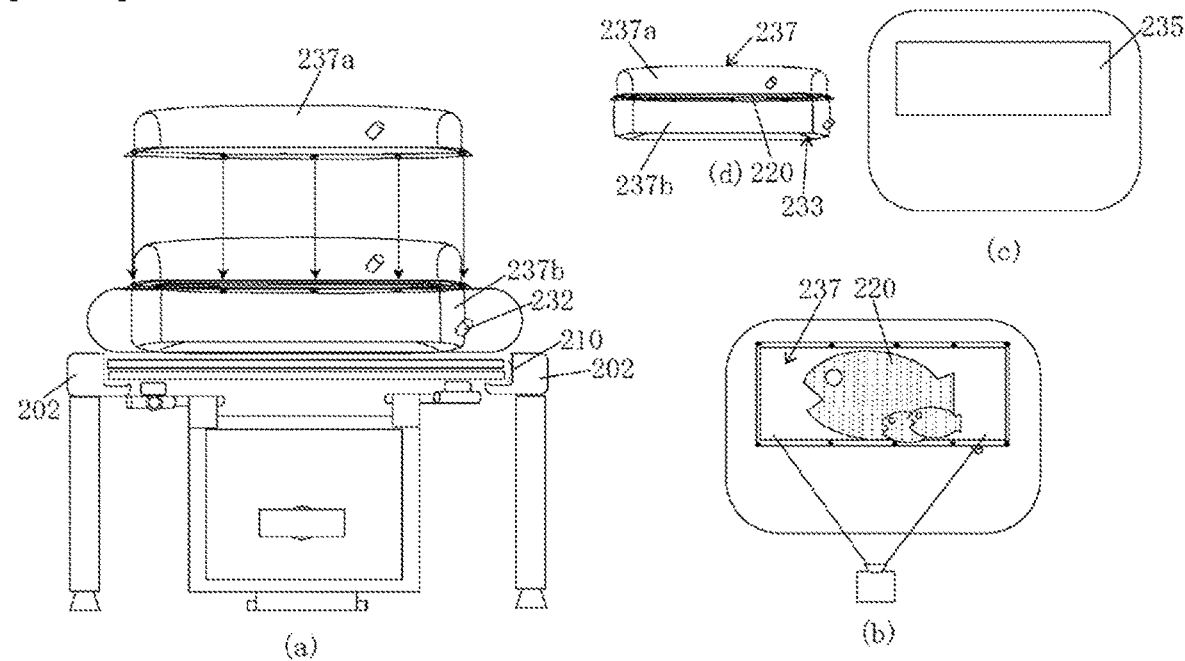
[FIG. 28]
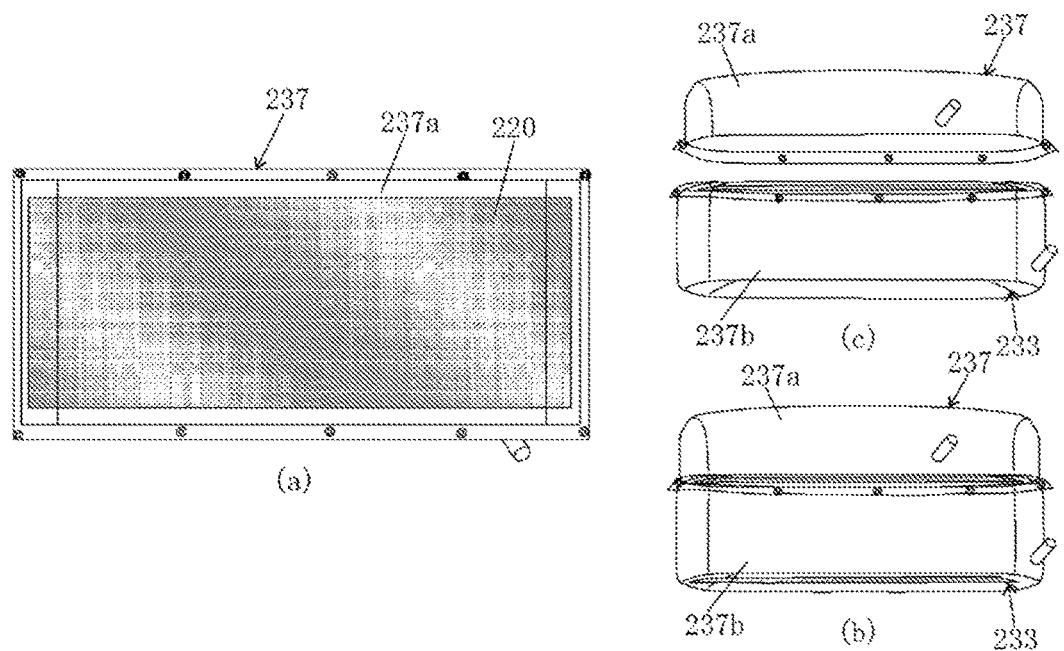

[FIG. 29]
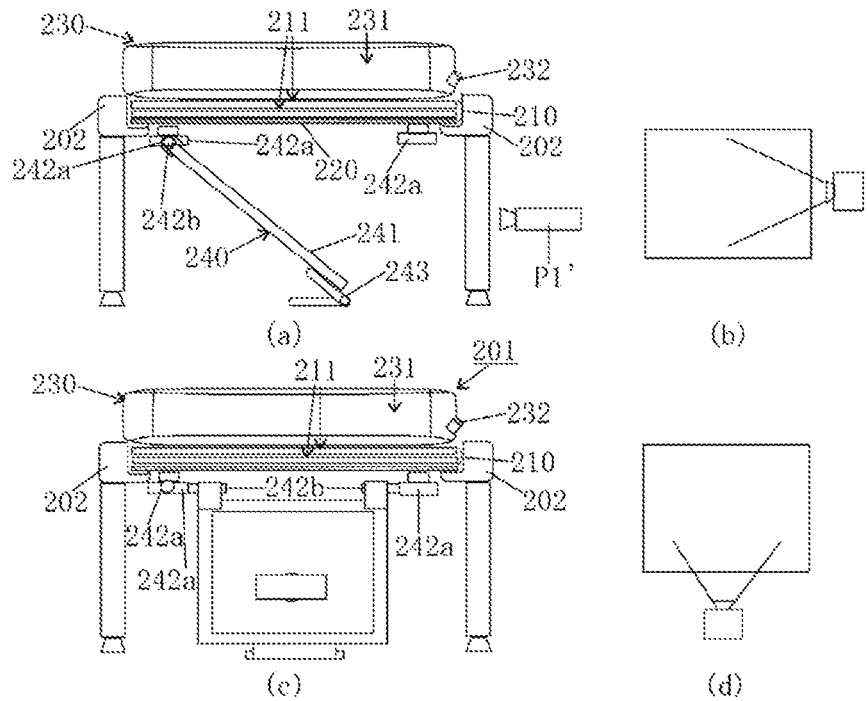
[FIG. 30]
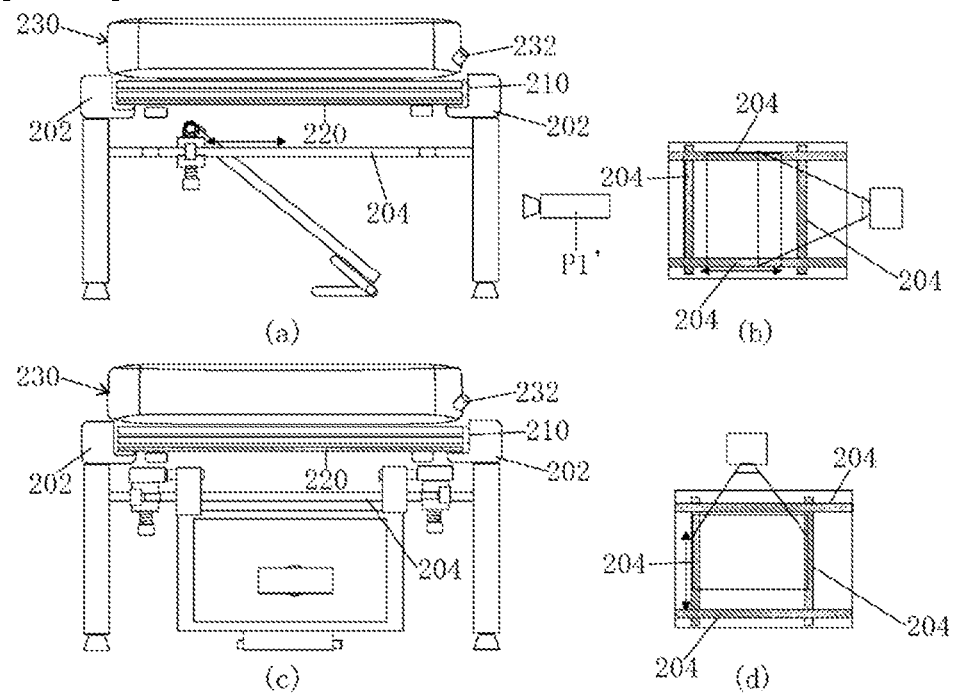

[FIG. 31]
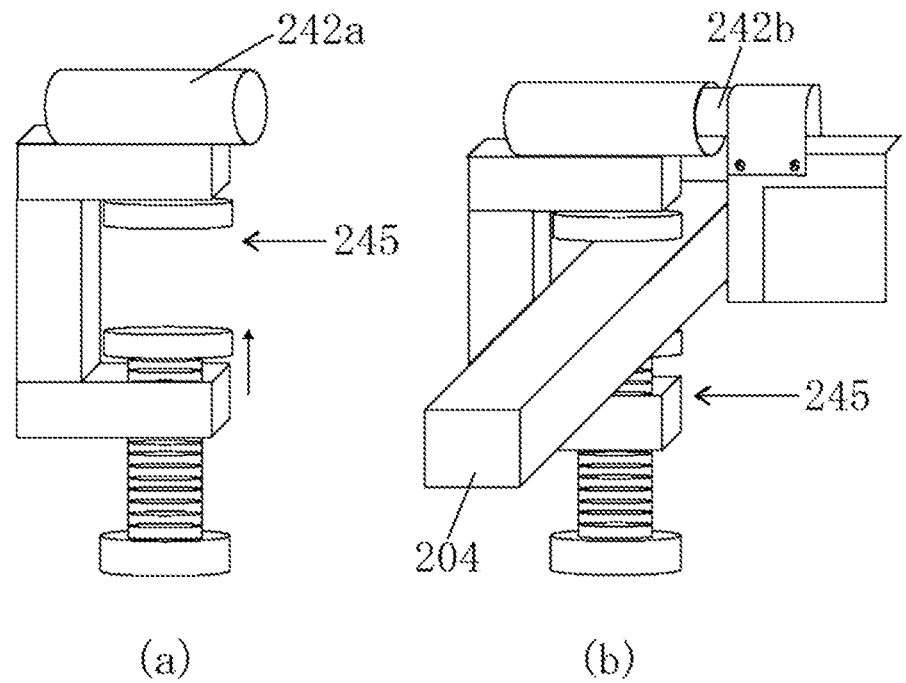
(a)   (b)
[FIG. 32]
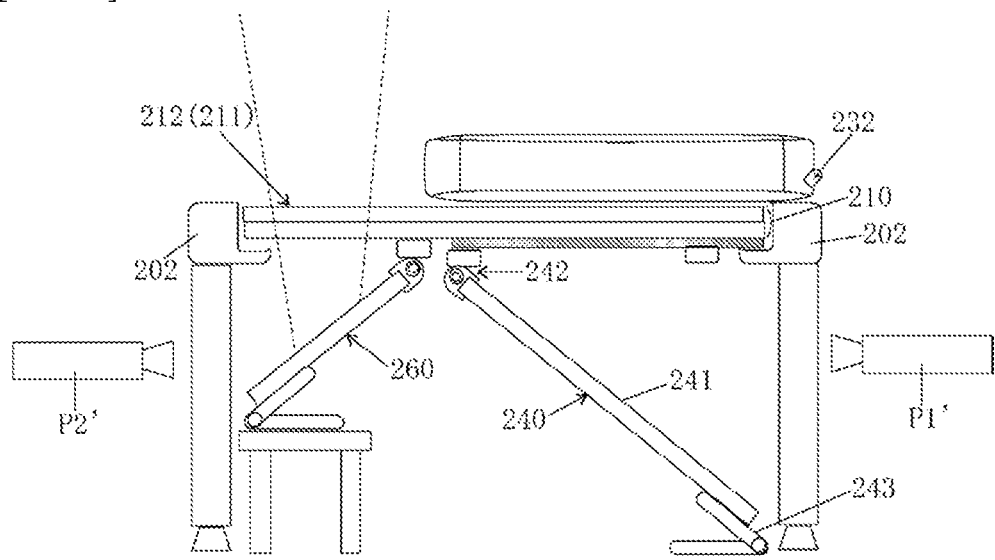

[FIG. 33]
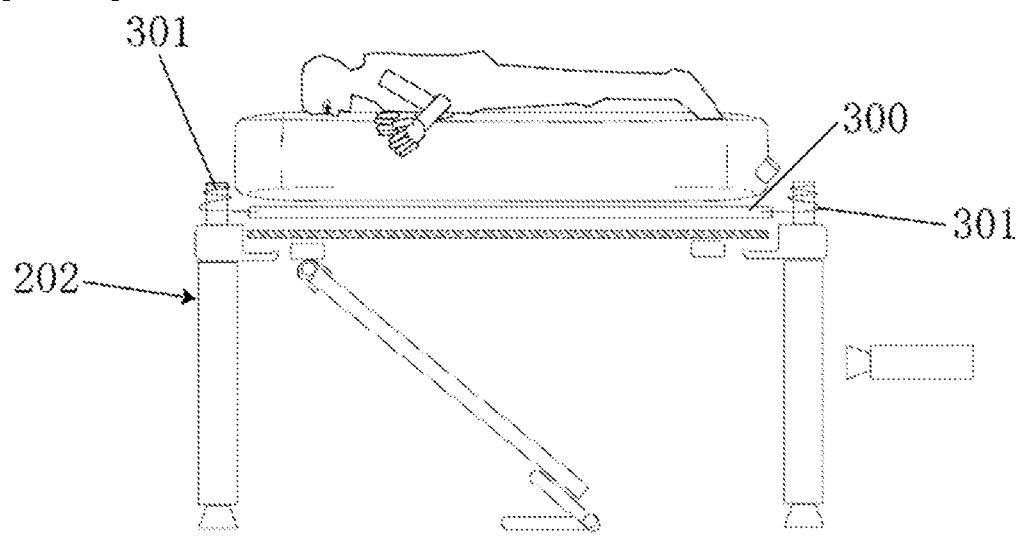
[FIG. 34]
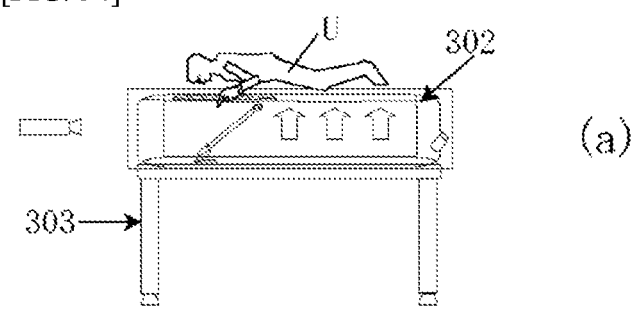
(a)
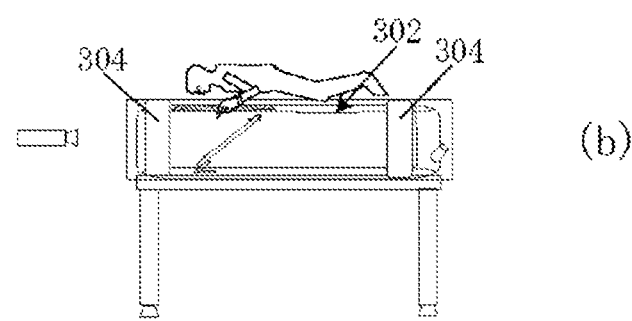
(b)
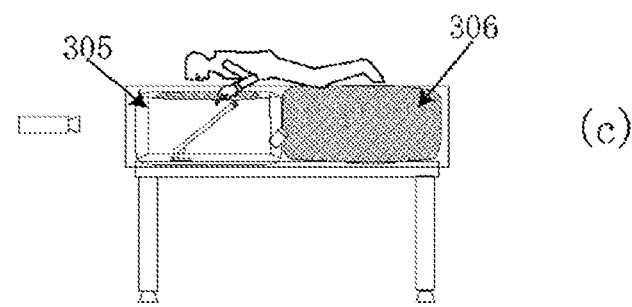
(c)

CUSHION WITH PROJECTOR SCREEN AND BED WITH PROJECTOR SCREEN

This application is the U.S. National Phase under 35 U.S.C. § 371 of International Application PCT/JP2017/000354, filed Jan. 9, 2017, which claims priority to Japanese Patent Application No. 2016-003106, filed Jan. 11, 2016, and No. 2016-178327, filed Sep. 13, 2016. The International Application was published under PCT Article 21(2) in a language other than English.

TECHNICAL FIELD

An object of the present invention is to provide a cushion with projector screen, and a bed with projector screen, each allowing a user lying face down to view images from a projector on a large screen.

BACKGROUND ART

One benefit of projectors over direct-viewing type displays is that they allow large images (videos and still images) to be viewed at low cost, and systems designed for a user lying face up on a bed have been available.

For example, Patent Literature 1 discloses an art of projecting light onto a ceiling from a projector placed at the foot of a bed and using the ceiling itself as a large screen.

Also, Patent Literature 2 discloses an art of putting up a free-standing screen at the foot of a bed and projecting light onto the screen from a projector placed at the head of the bed.

BACKGROUND ART LITERATURE

Patent Literature

Patent Literature 1: Published Japanese Translation of PCT International Patent No. 2004-516521

Patent Literature 2: Japanese Utility Model Laid-open No. Hei 5-60353

SUMMARY OF THE INVENTION

Problems to be Solved by the Invention

However, the aforementioned prior arts represent systems that allow a user lying face up on a bed to view a large screen, and not systems designed for a user lying face down on a bed.

In light of the aforementioned problem, an object of the present invention is to provide a cushion with projector screen, and a bed with projector screen, each allowing a user lying face down to view images from a projector on a large screen.

Means for Solving the Problems

The cushion with projector screen proposed by the present invention is characterized by comprising at least: a cushion main body; a transmission-type screen layer; and a reflector mirror that reflects the light projected from a first projector and projects it onto the transmission-type screen layer; wherein a user views images projected onto the transmission-type screen layer while lying face down on the cushion main body.

Also, it is characterized in that: the cushion main body is hollow and filled with air or light-transmissive fluid inside; the transmission-type screen layer represents a first transmission-type screen layer placed at the top part of the cushion main body; the reflector mirror represents a first reflector mirror placed inside the cushion main body below the first transmission-type screen layer to reflect the light projected from the first projector and project it onto the first transmission-type screen layer; the cushion main body has a transparent part that transmits the light from the first projector therethrough; and a user lying face down on the cushion main body views the images projected onto the first transmission-type screen layer through the transparent part.

Also, it is characterized in that it has an angle-adjustment mechanism that changes the inclination angle of the first reflector mirror relative to the horizontal plane.

Also, it is characterized in that the cushion main body is compressible and flexible, while the first transmission-type screen layer and first reflector mirror are flexible, so that they can be rolled or folded.

Also, it is characterized in that the cushion main body does not transmit light, except in the transparent part.

Also, it is characterized in that the first reflector mirror can be removed from the cushion main body to the outside.

Also, it is characterized in that it has an anti-wrinkle means for preventing the first transmission-type screen layer from wrinkling.

Also, it is characterized in that it has one or two or more second transmission-type screen layers extending in the vertical direction from the top part of the cushion main body.

Also, it is characterized in that it has outer skeleton parts enclosing the periphery of the cushion main body.

Also, it is characterized in that it has a second reflector mirror placed inside the cushion main body below the first transmission-type screen layer to reflect the light projected from a second projector and project it onto the first transmission-type screen layer.

The bed with projector screen proposed by the present invention is characterized in that it is equipped with the aforementioned cushion with projector screen.

Also, the bed with projector screen proposed by the present invention is characterized by being equipped with the aforementioned cushion with projector screen; and it comprises: a floorboard which is a sheet-shaped member and has a first transparent part extending from the top face to the reverse face in at least one location; the aforementioned transmission-type screen layer positioned so that it covers the first transparent part; and a mattress which is placed above the floorboard and has a second transparent part extending from the top face to the reverse face and positioned so that it covers at least the first transparent part and the transmission-type screen layer; wherein the reflector mirror represents a first reflector mirror placed inside the space below the floorboard to reflect the light projected from the first projector and project it onto the transmission-type screen layer; the first reflector mirror is supported by a leg part; and a user lying face down on the mattress views the images projected onto the transmission-type screen layer through the second transparent part and the first transparent part.

Also, it is characterized in that the inclination angle of the first reflector mirror relative to the horizontal plane is variable.

Also, it is characterized in that the mattress has pockets, and the transmission-type screen layer is attached to the mattress by inserting the transmission-type screen layer into these pockets.

Also, it is characterized in that the orientation of the first reflector mirror can be changed based on whether the light from the first projector is projected from the lateral direction with respect to the bed or from the longitudinal direction with respect to the bed.

Also, it is characterized in that the position in the longitudinal direction, and position in the lateral direction, of the first reflector mirror, are variable.

Also, it is characterized in that the floorboard is a flexible sheet-shaped member.

Effects of the Invention

The cushion with projector screen proposed by the present invention provides a mechanism whereby the light from the first projector is projected from below onto the transmission-type screen layer (first transmission-type screen layer) and the user views the projected images, allowing the user lying face down on the cushion main body to view the images from the projector on a large screen.

If the projector is installed on the ceiling surface so that its optical axis travels downward in the vertical direction and the surface of the mattress is used as a screen, problems occur such as parts of the image being blocked by the user or by a blanket, etc., or images being covered by the user's shadow. There are also safety problems such as the light from the projector getting directly into the eyes of the user lying face up.

The present invention solved these problems by projecting the light from the projector onto the transmission-type screen upward from below.

Also, when the light from the first projector is projected upward from underneath, one way to do this is to install the projector in the space under the bed so that its optical axis travels upward in the vertical direction. To project images on a large screen, however, the distance from the screen to the projector must have a certain length, so installing the projector vertically under the bed presents a problem in that a sufficient distance cannot be ensured between the two. Also, it is necessary to prepare a projector that supports such vertical installation, which presents a problem of limited choice when selecting a projector.

The present invention solved these problems by reflecting the light from the first projector upward in the vertical direction using the first reflector mirror. Also, the image size can be controlled by changing the distance from the first reflector mirror to the first projector, which means that images can be adjusted to the size of the first transmission-type screen layer.

Also, large-screen images projected onto the first transmission-type screen layer are viewed through the air, water, gel, etc., inside the cushion main body, which is suitable for entertainment applications because the user can experience a unique feeling of floating and a sense of realism.

Also, based on Pascal's law, the pressure generated by the weight of the user is applied to, through the air, water, or other fluid inside the cushion main body, and distributed over, the faces constituting the shell of the cushion main body (refer to the arrows inside the cushion main body 10 in FIG. 1 (a)). As a result, the faces constituting the cushion main body remain flat and the first transmission-type screen layer does not wrinkle easily.

Also, the user can view images lying face down on the bed, which is suitable for the care of patients, etc., who have difficulty lying face up due to lower back pain, etc.

The flexibility of installation position of the first projector can be increased, and the image position on the first transmission-type screen layer can also be changed, by changing the inclination angle of the first reflector mirror using the angle-adjustment mechanism.

By making the cushion main body compressible and flexible and the first transmission-type screen layer and first reflector mirror flexible, the cushion with projector screen can be rolled or folded for easy transport.

These features also contribute to the weight reduction of the cushion with projector screen.

By adopting the constitution whereby the cushion main body does not transmit light except in the transparent part, the light reflected by the first reflector mirror does not leak out from the cushion main body to annoy third parties nearby. Also, no light enters the first reflector mirror except for the light projected from the first projector, which allows the user to view vivid images.

By adopting the constitution whereby the first reflector mirror can be removed from the cushion main body to the outside, the cushion main body from which the first reflector mirror has been removed can be compressed for easy transport. Also, this feature provides excellent maintainability of the first reflector mirror when it gets dirty or damaged.

By putting in place the anti-wrinkle means for preventing the first transmission-type screen layer from wrinkling, the user can view vivid images.

By providing one or two or more second transmission-type screen layers extending in the vertical direction from the top part of the cushion main body, the user can view the image on the first transmission-type screen layer by lying face down, and also view the image(s) on the second transmission-type screen layer(s) by facing sideways.

By providing the outer skeleton parts enclosing the periphery of the cushion main body, the amount of deflection of the cushion main body can be reduced and the user can maintain a stable posture while lying face down, and wrinkling of the first transmission-type screen layer can also be reduced.

By providing the second reflector mirror to reflect the light projected from the second projector and project it onto the first transmission-type screen layer, the user can view the images from the first projector and second projector together. If adjustments are to be made to combine the images from the first projector and second projector into one large image, the distance from the floor surface to the first transmission-type screen layer can be shortened to reduce the height of the cushion with projector screen.

By providing the bed with an opening part in which the cushion with projector screen can be fitted, the user can view large-screen images while lying face down on the bed, and also sleep in the same posture when not using the cushion with projector screen.

The bed with projector screen proposed by the present invention provides a mechanism whereby the light from the first projector is projected onto the transmission-type screen layer from under the bed and the user views the projected images through the transparent location of the floorboard or mattress, allowing the user lying face down on the bed to view the images from the projector on a large screen.

If the projector is installed on the ceiling surface so that its optical axis travels downward in the vertical direction and the surface of the mattress is used as a screen, problems occur such as parts of the image being blocked by the user or by a blanket, etc., or images being covered by the user's shadow. There are also safety problems such as the light from the projector getting directly into the eyes of the user lying face up.

The present invention solves these problems by projecting the light from the projector onto the transmission-type screen upward from under the bed.

Also, when the light from the projector is projected upward from under the bed, one way to do this is to install the projector in the space under the bed so that its optical axis travels upward in the vertical direction. To project images on a large screen, however, the distance from the screen to the projector must have a certain length, so installing the projector vertically under the bed presents a problem in that a sufficient distance cannot be ensured between the two. Also, it is necessary to prepare a projector that supports such vertical installation, which presents a problem of limited choice when selecting a projector.

The present invention solved this problem by using the first reflector mirror to reflect the light from the projector traveling in the horizontal direction, to travel upward in the vertical direction. Also, the image size can be controlled by changing the distance from the first reflector mirror to the projector, which means that a screen can be installed in a pillow or other relatively small object to project images thereon.

Also, large-screen images projected onto the transmission-type screen layer are viewed through the air, water, gel, etc., inside the mattress, which is suitable for entertainment applications because the user can experience a unique feeling of floating and a sense of realism.

Also, the user can view images lying face down on the bed, which is suitable for the care of patients, etc., who have difficulty lying face up due to lower back pain, etc.

By making the inclination angle of the first reflector mirror changeable and its position adjustable in the longitudinal direction and lateral direction, the flexibility of installation position of the projector can be increased and the image position on the transmission-type screen layer can also be changed.

Also, when a constitution is adopted whereby the orientation of the first reflector mirror can be changed, the light from the projector can be projected from either the lateral direction or the longitudinal direction with respect to the bed according to the vertical/horizontal orientation of the image content.

Also, when projection onto the ceiling surface is made possible using the second reflector mirror, the user can view large-screen images not just by lying face down, but also by lying face up.

Also, when a transmission-type screen layer is installed in a separable part that is freely detachable or re-attachable from/to the mattress, the separable part can be used as a body pillow.

BRIEF DESCRIPTION OF THE DRAWINGS

FIG. 1 A front view (a), a side view (b), and a front view in compressed state (c), of the cushion with projector screen according to the first embodiment;

FIG. 2 A plan view (a), and a side view (b), showing the first transmission-type screen layer with its ends inserted into the pockets;

FIG. 3 A front view showing the first transmission-type screen layer fixed inside the top face of the cushion main body;

FIG. 4 A front view (a) showing the transparent sheet used as an anti-wrinkle means installed on the outside, and a front view (b) showing it installed on the inside, of the top face of the cushion main body;

FIG. 5 A perspective view (a) showing the pocket structures, and a perspective view (b) showing the transparent sheet inserted into the pockets;

FIG. 6 A front view (a), and a side view (b), showing a constitutional example of the angle-adjustment mechanism;

FIG. 7 A front view showing other constitutional example of the angle-adjustment mechanism;

FIG. 8 A front view (a), and a side view (b), showing other constitutional example of the angle-adjustment mechanism;

FIG. 9 A front view showing the cushion main body structured in such a way that it does not transmit light other than in the transparent part;

FIG. 10 A front view (a), and a side view (b), showing the outer skeleton parts inserted from the front and rear, as well as a front view (c), and a side view (d), showing them inserted from the left and right, of the cushion main body;

FIG. 11 A front view (a), and a side view (b), of the compressible and flexible cushion main body and the flexible transmission-type screen layer and first reflector mirror, as well as a front view in compressed state (c), and a front view in rolled state (d), of the cushion with projector screen;

FIG. 12 A front view (a), and a plan view (b), showing the cushion main body having a slit, as well as a front view (c) showing the first reflector mirror having been taken out of the slit;

FIG. 13 A front view (a) showing the constitution whereby the cushion main body is divided into two sections by the slit provided therein, and a front view (b) showing the first reflector mirror being inserted into the slit;

FIG. 14 A front view (a) showing the cushion with projector screen according to the second embodiment, and a front view (b) showing the cushion with projector screen according the first embodiment for comparison;

FIG. 15 A front view (a), and a side view (b), showing two cushions with projector screens according to the first embodiment, placed side by side in a manner facing each other;

FIG. 16 A front view (a) showing the constitution whereby one second transmission-type screen layer is provided, and a front view (b) showing the constitution whereby a projector used exclusively for the second transmission-type screen layer is provided, according to the third embodiment;

FIG. 17 A front view (a) showing the constitution whereby two second transmission-type screen layers are provided on the left and right of the cushion main body, and a front view (b) showing the constitution whereby films made of a non-light-transmitting material are provided;

FIG. 18 A side view (a) showing the cushion with projector screen being fitted into the opening part, as well as a side view (b), and a plan view (c), showing the fitted cushion;

FIG. 19 A side view (a), and a front view (b), of the bed with projector screen according to the first embodiment;

FIG. 20 Enlarged views (a), (b) showing the support structure for the reflective surface;

FIG. 21 Side views (a), (b) showing an example of placement of the transmission-type screen layer when the bottom plate is constituted by two plate bodies;

FIG. 22 A side view (a), and a front view (b), showing another constitutional example of the bed with projector screen;

FIG. 23 Side views (a), (b) showing another constitutional example of the bed with projector screen;

FIG. 24 A side view (a) of the bed with projector screen, as well as a plan view (b), and a side view (c), of the mattress, according to the second embodiment;

FIG. 25 A side view (a), and a plan view (b), of the bed with projector screen, and a plan view (c) of the separable part having been taken out of the mattress main body, according to the third embodiment;

FIG. 26 A plan view (a) showing another constitutional example of the mattress, a side view (b) of the separable part, and a side view (c) of other parts;

FIG. 27 A side view (a), and a schematic plan view (b), of the bed with projector screen, a plan view (c) of the mattress main body, and a side view (d) of the separable part, according to the fourth embodiment;

FIG. 28 A plan view (a), and a side view (b), of the separable part of the mattress, and a side view (c) showing the separable part separated into the top part and the bottom part;

FIG. 29 A side view (a), and a schematic plan view (b), of the bed with projector screen with the projector placed at the rear, as well as a side view (c), and a schematic plan view (d), of the bed with projector screen with the projector placed on the left side, according to the fifth embodiment;

FIG. 30 A side view (a), and a rear view (b), of the bed with projector screen with the projector placed at the rear, as well as a side view (c), and a rear view (d), of the bed with projector screen with the projector placed on the left side, according to the sixth embodiment;

FIG. 31 Perspective views (a), (b) showing the structure of the clamp mechanism;

FIG. 32 A side view of the bed with projector screen according to the seventh embodiment;

FIG. 33 A side view of the bed with projector screen according to the eighth embodiment;

FIG. 34 A side view (a) of the bed with projector screen according to the ninth embodiment, and side views (b), (c) showing variation examples.

MODE FOR CARRYING OUT THE INVENTION

First Embodiment

The first embodiment of the cushion with projector screen proposed by the present invention is described below using the drawings.

As shown in FIG. 1, the user U lies face down on the cushion with projector screen 1 and views large-screen images as the light projected from the first projector P1 is reflected on the first reflector mirror 30 and projected onto the first transmission-type screen layer 20.

The cushion with projector screen 1 roughly comprises a cushion main body 10, a first transmission-type screen layer 20, a first reflector mirror 30, and an angle-adjustment mechanism 40.

The cushion main body 10 is hollow and filled with air or light-transmitting fluid 11 inside. The material for the cushion part is preferably, but not limited to, a soft vinyl chloride or other transparent and flexible material, for example.

The air or light-transmitting fluid 11 is filled inside the cushion main body 10 via an inlet 12. The light-transmitting fluid 11 may be, but is not limited to, water or other transparent liquid, or transparent substance such as gel.

In this embodiment, the cushion main body 10 has a rectangular solid shape; in addition to the foregoing, however, it may also have a cylindrical shape, a semi-cylindrical cross-sectional shape, a crescent cross-sectional shape, or the like, for example. Dimension-wise, preferably the cushion main body 10 has enough length and width to allow the user U to lie face down on top of it.

The first transmission-type screen layer 20 is placed at the top part of the cushion main body 10 and the light from the first projector P1 is projected onto it. It suffices that the first transmission-type screen layer 20 is constituted by any known transmission-type screen, so its material and properties are not explained.

The methods for fixing the first transmission-type screen layer 20 include, for example, a method whereby the ends of the first transmission-type screen layer 20 are inserted into pockets 21 placed on the top face of the cushion main body 10 on the outside as shown in FIG. 2, a method whereby it is fixed with surface fasteners, fasteners, hooks or other known means in a freely detachable/re-attachable manner, a method whereby it is bonded with an adhesive, and the like. It should be noted that, as shown in FIG. 3, the first transmission-type screen layer 20 may be fixed to the top face of the cushion main body 10 on the inside.

Also, as shown in FIG. 4 (a), a transparent sheet 51 may be present on the bottom face (or top face) of the first transmission-type screen layer 20 as an anti-wrinkle means 50. It suffices that the transparent sheet 51 is manufactured using any transparent material such as reinforced glass, transmitting plastic or acrylic material, etc. Furthermore, as shown in FIG. 4 (b), by attaching another transparent sheet 51 on a side face of the cushion main body 10 where the light from the first projector P1 passes through, wrinkling of this location can be prevented. As shown in FIG. 5, the transparent sheet 51 can be inserted into pockets 52 at its ends, fixed with surface fasteners or other known means in a freely detachable/re-attachable manner, or bonded with an adhesive.

The first reflector mirror 30 is placed inside the cushion main body 10 below the first transmission-type screen layer 20, to reflect the light from the first projector P1 and project it onto the first transmission-type screen layer 20. In this embodiment, a general, flat-shaped mirror having little flexibility is used for the first reflector mirror 30.

The angle-adjustment mechanism 40 is provided to allow the inclination angle of the first reflector mirror 30 to be changed relative to the horizontal plane, and is installed at the bottom part of the first reflector mirror 30 in this embodiment. To be specific, the angle-adjustment mechanism comprises a connection part 41 and a leg part 42, and is structured in such a way that, when the connection part 41 is pivotally supported on the leg part 42, it can rotate freely around the pivotally supported location. Once the connection part 41 is fixed at the bottom part of the first reflector mirror 30, and the leg part 42 is fixed to the bottom face of the cushion main body 10, the first reflector mirror 30 can rotate within the vertical plane to allow the inclination angle of the first reflector mirror 30 to be changed relative to the horizontal plane.

To project the light from the first projector P1 with its optical axis running parallel with the horizontal plane, preferably the inclination angle of the first reflector mirror 30 relative to the horizontal plane is set to 45 degrees. By setting the inclination angle to 45 degrees, the light reflected on the first reflector mirror 30 can be guided to enter the first transmission-type screen layer 20 vertically, to minimize any distortion of the projected images. Also, such distortion may be reduced using a trapezoidal distortion correction function installed in the first projector P1 (such function is installed in almost all models of projectors currently available on the market), instead of adjusting the inclination angle. It should be noted that the light from the first projector P1 may have to be reversed before projection, if necessary.

The angle-adjustment mechanism 40 may adopt any of the constitutions shown in FIGS. 6 to 8.

The angle-adjustment mechanism in FIG. 6 is constituted by a flexible backing material 43 attached to the reverse face of the first reflector mirror 30 (face on which the reflective surface is not provided), chains 44 installed at the bottom part of the first reflector mirror 30, and hooks 45 installed on a part of the interior face of the cushion main body 10. The top side of the backing material 43 is fixed to the top face of the cushion main body 10 on the inside (location enclosed by a circle drawn with a broken line in the figure), and therefore the first reflector mirror 30 is supported in a manner rotatable around the fixed location within the vertical plane. The user U releases a small amount of air, etc., from the cushion main body 10 to compress the cushion main body 10 slightly, and then grabs the chains 44 from the outside of the cushion main body 10 and hangs them on the hooks 45. The inclination angle of the first reflector mirror 30 can be changed according to the position at which the chains 44 are hung on the hooks 45.

The angle-adjustment mechanism in FIG. 7 is different from the angle-adjustment mechanism in FIG. 6 in that it uses strings 46 and plugs 47 instead of the chains 44 and hooks 45. To be specific, one end of each string 46 is attached to the bottom part of the first reflector mirror 30, while the other end is attached to the periphery of a shaft part 47a of each plug 47. A head part 47b of the plug 47 is exposed to the outside through an opening part 13 provided in the side face of the cushion main body 10. The opening part 13 is caulked by an O-ring, rubber gasket 48, etc., from above the shaft part 47a, to prevent the air, etc., inside the cushion main body 10 from leaking out. As the user U turns the head parts 47b around the shafts to wind the strings 46 onto the shaft parts 47a, the bottom part of the first reflector mirror 30 is pulled toward the shaft parts 47a, to allow the inclination angle of the first reflector mirror 30 to be changed.

The angle-adjustment mechanism in FIG. 8 is different from the angle-adjustment mechanism in FIG. 7 in that it uses expansion parts 49 instead of the plugs 47. To be specific, the other end of each string 46 is attached to the top end of each expansion part 49. When the user U introduces air, etc., into the expansion parts 49 through inlets 49a, the volumes of the expansion parts 49 increase and accordingly the bottom part of the first reflector mirror 30 is pulled upward, to allow the inclination angle of the first reflector mirror 30 to be changed.

It should be noted that the cushion with projector screen 1 may be constituted in a manner having no angle-adjustment mechanism 40.

The cushion main body 10 has a transparent part 14 (refer to FIG. 1 (a)) in at least one location. The light projected from the first projector P1 placed outside the cushion main body 10 passes through the transparent part 14, reflects on the first reflector mirror 30 placed inside the cushion main body 10, and reaches the first transmission-type screen layer 20. In other words, the transparent part 14 is provided at the location on the surface constituting the shell of the cushion main body 10, where the optical path from the first projector P1 to the first reflector mirror 30 overlaps the optical path from the first reflector mirror 30 to the first transmission-type screen layer 20.

It suffices that the transparent part 14 is manufactured using any transparent material such as soft vinyl chloride or other resin or glass; to make the cushion main body 10 compressible and flexible as described below, however, preferably the transparent part 14 is manufactured using a soft vinyl chloride or other resin.

As shown in FIG. 9, the cushion main body 10 may be structured so that it does not transmit light except in the transparent part 14. To be specific, a non-light-transmitting film S or non-light-transmitting material may be attached or applied to the parts of the cushion main body 10 except the transparent part 14, or these parts themselves may be manufactured using a non-light-transmitting material. This way, diffusion of the light L1 from the inside toward the outside of the cushion main body 10 can be reduced, to save third parties X other than the user U from discomfort due to glare, etc. Also, the stray light L2 emitted by the first projector P1, etc., and entering the cushion main body 10 from the outside decreases, so the user U can view vivid images from the first projector P1.

As shown in FIG. 10, outer skeleton parts 60 enclosing the periphery of the cushion main body 10 may be provided. To be specific, square-framed members can be inserted from the front and rear (FIGS. 10 (a), (b)), or left and right (FIGS. 10 (c), (d)), of the cushion main body 10 to prevent the cushion main body 10 from deflecting or otherwise deforming due to the weight of the user U and thereby allow the user U lying face down to maintain a stable posture, while also preventing problems such as wrinkling of the first transmission-type screen layer 20.

Also, as shown in FIG. 11, the cushion main body 10 may be made compressible and flexible, while the transmission-type screen layer and first reflector mirror 30 may be flexible. This way, the cushion with projector screen 1 can be compressed and rolled or folded for improved portability (refer to FIGS. 1 (c), 11 (c), (d)).

Also, as shown in FIG. 12, a slit 15 extending diagonally downward from the top face of the cushion main body 10 may be provided in the constitution in FIG. 11. In this case, the first reflector mirror 30 need not be flexible, which means that a general, flat-shaped mirror having little flexibility can be used for the first reflector mirror 30. When in use, the first reflector mirror 30 can be inserted into the slit 15 to keep the first reflector mirror 30 inclined relative to the horizontal plane; when not in use, on the other hand, the first reflector mirror 30 can be taken out of the slit 15 and the cushion main body 10 can be rolled or folded. Also, maintainability of the first reflector mirror 30 when it gets dirty or damaged, is excellent. It should be noted that the inclination angle of the first reflector mirror 30 can be adjusted by adjusting the amount of air, etc., filled in the cushion main body 10. Also, as shown in FIG. 13, the cushion main body 10 may be structured in such a way that its interior is divided into two sections A, B by a slit 15a provided therein. In this case, the inclination angle of the first reflector mirror 30 can be adjusted more accurately by adjusting the amount of air, etc., filled in each section A, B.

Second Embodiment

Next, the second embodiment of the cushion with projector screen proposed by the present invention is explained; it should be noted that those locations whose constitution is the same as in the aforementioned first embodiment are denoted by the same symbols and not explained.

As shown in FIG. 14, the cushion with projector screen 2 in this embodiment is characterized in that it has a second reflector mirror 31. To be specific, the second reflector mirror 31 is placed inside the cushion main body 10 below the first transmission-type screen layer 20. Furthermore, the second reflector mirror 31 reflects the light from a second projector P2 placed outside the cushion main body 10 and projects it onto the first transmission-type screen layer 20. Preferably the first projector P1 and the second projector P2 are placed in a manner facing each other so that their optical axes align along the same straight line. And, by allowing the image from the first projector P1 to constitute the right half of the overall image, and the image from the second projector P2 to constitute the left half of the overall image, for example, the image reflected on the first reflector mirror 30 and projected onto the first transmission-type screen layer 20 can be combined with the image reflected on the second reflector mirror 31 and projected onto the first transmission-type screen layer 20, into one large-screen image.

According to such constitution, the distance from the first reflector mirror 30 or second reflector mirror 31 to the first transmission-type screen layer 20 can be shortened compared to the constitution having only the first reflector mirror 30 as described in the aforementioned first embodiment, and consequently the height of the cushion with projector screen 2 can be reduced.

It should be noted that, when two cushions with projector screens 1 according to the first embodiment are placed side by side in a manner facing each other, as shown in FIG. 15, the viewed images are twice as long in the lateral direction (wide) as those provided by the cushion with projector screen 1 in the first embodiment.

Third Embodiment

Next, the third embodiment of the cushion with projector screen proposed by the present invention is explained; it should be noted that those locations whose constitution is the same as in the aforementioned first and second embodiments are denoted by the same symbols and not explained.

As shown in FIG. 16 (a), the cushion with projector screen 3 in this embodiment is characterized in that it has one second transmission-type screen layer 70 extending in the vertical direction from the top part of the cushion main body 10 on the right side.

The second transmission-type screen layer 70 is attached to a transparent cushion material 71, and the cushion material 71 is supported with strings, bars 72, etc.

By using a computer C to control the first projector P1 to project identical images arranged on top of each other, the top image can be projected onto the second transmission-type screen layer 70, while the bottom image can be projected onto the first transmission-type screen layer 20 via the first reflector mirror 30. The user U can view the same image on the first transmission-type screen layer 20 when lying face down, or on the second transmission-type screen layer 70 when lying sideways.

It should be noted that, as shown in FIG. 16 (b), a projector P3 used exclusively for the second transmission-type screen layer 70 may be provided. Furthermore, as shown in FIG. 17 (a), two second transmission-type screen layers 70 may be provided on the left and right of the cushion main body 10. Also, a structure may be adopted whereby convex parts 73 are provided on the cushion material 71 of the second transmission-type screen layer 70, so that the second transmission-type screen layer 70 is supported by fitting the convex parts 73 into concave parts 74 provided in the cushion main body 10. Also, as shown in FIG. 17 (b), a mechanism may be adopted whereby films 75 made of a non-light-transmitting material are provided, instead of the two second transmission-type screen layers 70 on the left and right, to shield the stray light L2 emitted from each projector.

Next, the bed using the cushion with projector screen 1 as proposed by the present invention is explained; it should be noted that those locations whose constitution is the same as in each of the aforementioned embodiments are denoted by the same symbols and not explained.

As shown in FIG. 18, the bed 100 proposed by the present invention is characterized in that it has an opening part 101 in which the cushion with projector screen 1 can be fitted.

The opening part 101 only needs to be provided in a bed frame 102, but if the bed 100 has a mattress, an opening part 101 must also be provided in the mattress. Also, the cushion with projector screen 1 may be pre-assembled into the bed 100 when it is manufactured. The user U can view large-screen images while lying face down on the bed 100, and also sleep in the same posture when not using the cushion with projector screen 1.

First Embodiment

The first embodiment of the bed with projector screen proposed by the present invention is explained below using the drawings.

As shown in FIGS. 19 and 20, the bed with projector screen 201 comprises at least a floorboard 210, a transmission-type screen layer 220, a mattress 230, and a first reflector mirror 240.

The floorboard 210 is a sheet-shaped member fixed to a square-framed bed frame 202 constituting the top part of the bed, and has a first transparent part 211 in at least one location.

It suffices that the floorboard 210 has sufficient strength to support the weight of the user, manufactured using any transparent material such as reinforced glass, transmitting plastic or acrylic material, etc. If all of the floorboard 210 is manufactured using any such transparent material, the entire floorboard 210 represents the first transparent part 211. If a part of the floorboard 210 is manufactured using a transparent material, on the other hand, only the transparent part represents the first transparent part 211. If a part of the floorboard 210 represents the first transparent part 211, it suffices that the remaining part of the floorboard 210 is manufactured using wood, metal, plastic, etc. In this embodiment, the entire floorboard 210 is transparent, meaning that the entire floorboard 210 represents the first transparent part 211.

Also, in this embodiment, two or more sheets are stacked to constitute the floorboard 210. By constituting the floorboard 210 with a stack of two or more sheets, its strength can be increased according to the weight of the user, and if the sheet constituting the top layer is damaged from the tossing and turning of the user, etc., only the damaged sheet can be replaced, to keep maintenance costs down.

The transmission-type screen layer 220 is a member positioned so that it covers the first transparent part 211, and the light from a first projector P1' is projected thereon. The material and properties of the transmission-type screen layer 220 are matters of common knowledge and therefore not explained.

It suffices that the transmission-type screen layer 220 is positioned so that it covers the first transparent part 211, and when the floorboard 210 is constituted by two sheets and the transmission-type screen layer 220 is placed between the sheets, as shown in FIG. 21 (a), such benefit as the transmission-type screen layer 220 not wrinkling due to the tossing and turning of the user, vibration, etc., and showing a greater tendency to remain flat over a long time, can be achieved. Also, as shown in FIG. 21 (b), the transmission-type screen layer 220 may be placed on two sheets. In this embodiment, the transmission-type screen layer 220 is placed on the bottom face of the floorboard 210. It should be noted that the transmission-type screen layer 220 may be lined with a transparent member to reinforce the transmission-type screen layer 220 while preventing it from wrinkling at the same time.

The mattress 230 is a member placed above the floorboard 210, and has a second transparent part 231 positioned so that it covers at least the first transparent part 211 and the transmission-type screen layer 220.

In this embodiment, the entire mattress 230 is formed in a hollow shape using a transparent and flexible material such as soft vinyl chloride, for example. Through an inlet 232, air, water or other transparent liquid or transparent substance such as gel is filled into the mattress 230.

When all of the mattress 230 is constituted by a transparent material, as is the case in this embodiment, the entire mattress 230 represents the second transparent part 231. When a part of the mattress 230 is constituted by such transparent material, on the other hand, only the transparent part represents the second transparent part 231. If a part of the mattress 230 represents the second transparent part 231, it suffices that the remaining part of the mattress 230 is manufactured using a colored soft vinyl chloride, rubber, etc. Also, the mattress 230 may be constituted so that the remaining part is covered with a fabric, etc.

As described above, this embodiment adopts a three-layer structure consisting of a top layer being the second transparent part 231 of the mattress 230, an intermediate layer being the first transparent part 211 of the floorboard 210, and a bottom layer being the transmission-type screen layer 220, with these layers placed on top of the bed frame 202.

The first reflector mirror 240 is placed under the floorboard 210, to reflect the light from the first projector P1' and project it onto the transmission-type screen layer 220.

To be specific, the first reflector mirror 240 comprises a reflective surface 241, a connection part 242, and a leg part 243, as shown in FIGS. 19 and 20.

The reflective surface 241 is a member to reflect the light from the first projector P1', and made of any known material such as glass. The periphery of the reflective surface 241 is enclosed by a square frame 241a.

The connection part 242 is a member attached to the topside of the frame 241a, and comprises cylindrical members 242a attached to two brackets 203 on the left and right of the bed frame 202, and rotational shafts 242b attached to the frame 241a. By inserting the rotational shafts 242b into the cylindrical members 242a, the reflective surface 241 is supported in a rotatable manner within the vertical plane along the longitudinal direction.

The leg part 243 is a member attached to the underside of the frame 241a, and supports the reflective surface 241 in a rotatable manner within the vertical plane along the longitudinal direction.

To project the light from the first projector P1' with its optical axis running parallel with the horizontal plane, preferably the inclination angle of the reflective surface 241 relative to the horizontal plane is set to 45 degrees. By setting the inclination angle to 45 degrees, the light reflected on the reflective surface 241 can be guided to enter the transmission-type screen layer 220 vertically, to minimize any distortion of the projected images. The inclination angle can be adjusted by adjusting the positions of the connection part 242 and leg part 243. It should be noted that the light from the first projector P1' may have to be inversed before projection, if necessary.

According to the bed with projector screen 201 in this embodiment, the user lying face down on the mattress 230 over the bed can view the large-screen images projected onto the transmission-type screen layer 220 through the second transparent part 231 and the first transparent part 211.

It should be noted that, as shown in FIG. 22, a pasteboard that does not transmit light, a colored film sheet that transmits light, or the like 250 can be fixed on the legs of the bed and the light from the first projector P1' can be guided to pass through it. This way, the shape, brightness, color rendering, etc., of images can be customized according to the mood in the bedroom.

Also, the user can adjust the output of the first projector P1' according to the lighting environment in the bedroom, thickness of the mattress 230, etc.

Also, as shown in FIG. 23, a mechanism may be adopted whereby slide-type metal fixtures 244 are attached to the brackets 203 so that the first reflector mirror 240 can be stored in a horizontal state when not in use.

Second Embodiment

The second embodiment of the present invention is explained; it should be noted that those locations whose constitution is the same as in the aforementioned first embodiment are denoted by the same symbols and not explained.

The bed with projector screen in this embodiment is characterized in that the transmission-type screen layer 220 is attached to the mattress 230.

To be specific, as shown in FIG. 24, a pocket 233 is formed in the bottom face of the mattress 230 beforehand, and the transmission-type screen layer 220 is inserted into this pocket 233.

According to the bed with projector screen in this embodiment, the light from the first projector P1' transmits through the first transparent part 211 and projects it onto the transmission-type screen layer 220. The user lying face down on the mattress 230 over the bed views the large-screen images on the transmission-type screen layer 220 through the second transparent part 231 of the mattress 230.

It should be noted that the transmission-type screen layer 220 may be taken out of the pocket 233 and placed on the bottom face side of the floorboard 210 as in the aforementioned first embodiment.

Third Embodiment

The third embodiment of the present invention is explained; it should be noted that those locations whose constitution is the same as in each of the aforementioned embodiments are denoted by the same symbols and not explained.

The bed with projector screen in this embodiment is characterized in that the mattress 230 has a separable part 234 which is freely detachable/re-attachable, and the separable part 234 has a transmission-type screen layer 220 and a second transparent part 231.

To be specific, the structure is such that, as shown in FIG. 25, the separable part 234 is integrally fitted in a through hole 235 formed in a part of the mattress 230 body, so the separable part 234 can be freely taken out of the through hole 235.

The transmission-type screen layer 220 is inserted into a pocket 233 provided on the bottom face of the separable part 234.

In the case of the bed with projector screen in this embodiment, only a part of the mattress 230 is used as a screen, resulting in lower manufacturing cost.

It should be noted that the mattress 230 body can be changed to a general Japanese mattress. In this case, a through hole 235 is formed in the under-quilt, and the separable part 234 is fitted in this through hole 235, and used.

Also, the mattress 230 structure may be constituted in such a way that not only the separable part 234, but also other parts 236a to 236d are made structurally separable, with each of these parts integrated into one piece using fasteners, hooks, surface fasteners or other known means.

Fourth Embodiment

The fourth embodiment of the present invention is explained; it should be noted that those locations whose constitution is the same as in each of the aforementioned embodiments are denoted by the same symbols and not explained.

The bed with projector screen in this embodiment is characterized in that, as in the third embodiment, the mattress 230 has a separable part 237 which is freely detachable/re-attachable and this separable part 237 is used as a body pillow.

To be specific, as shown in FIGS. 27 and 28, a long through hole 235 is formed in the mattress 230 in the longitudinal direction, and the separable part 237 is fitted in this through hole 235.

The separable part 237 is structured in such a way that it can be further separated into a top part 237a and a bottom part 237b. With the transmission-type screen layer 220 inserted into the pocket 233 underneath, the top part 237a and the bottom part 237b are joined together using fasteners, hooks, surface fasteners or other known means provided along the peripheries thereof. According to the constitution in this embodiment, the entire top part 237a represents the second transparent part 231.

When the transmission-type screen layer 220 is provided effectively over the entire expanse of the long separable part 237 extending in the longitudinal direction, preferably the first projector P1' is placed on the left or right side of the bed.

According to the constitution in this embodiment, the long, longitudinally separable part 237 can be used as a body pillow, and the user can view the large-screen images on the transmission-type screen layer 220 while lying face down and hugging the separable part 237.

Also, the mattress 230 can be used as one having a flat surface, by fitting only the bottom part 237b of the separable part 237 into the through hole 235.

Fifth Embodiment

The fifth embodiment of the present invention is explained; it should be noted that those locations whose constitution is the same as in each of the aforementioned embodiments are denoted by the same symbols and not explained.

The bed with projector screen in this embodiment is characterized in that the orientation of the first reflector mirror 240 can be changed based on whether the light from the first projector P1' is projected from the lateral direction with respect to the bed or from the longitudinal direction with respect to the bed.

To be specific, the mechanism is such that, as shown in FIG. 29, the cylindrical members 242a are provided not only at two locations on the left and right, but also at two locations in the front and rear, so that the orientation of the first reflector mirror 240 can be changed based on whether the rotational shafts 242b are fitted in the cylindrical members 242a at the two locations on the left and right (FIG. 29 (a)) or in the cylindrical members 242a at the two locations in the front and rear (FIG. 29 (b)).

The user can change the orientation of the first reflector mirror 240 according to the type (aspect ratio, etc.) of image.

Sixth Embodiment

The sixth embodiment of the present invention is explained; it should be noted that those locations whose constitution is the same as in each of the aforementioned embodiments are denoted by the same symbols and not explained.

The bed with projector screen in this embodiment is characterized in that it conforms to the constitution in the fifth embodiment except that the position of the first reflector mirror 240 is variable in the longitudinal direction and the lateral direction.

To be specific, guide frames 204 are passed in the longitudinal direction and lateral direction with respect to the legs of the bed, as shown in FIGS. 30 and 31. The cylindrical members 242a are fixed to screw-type clamp mechanisms 245.

The user can adjust the longitudinal and lateral positions of the first reflector mirror 240 by moving the cylindrical members 242a horizontally to desired positions and then fixing them to the guide frames 204 using the clamp mechanisms 245.

Seventh Embodiment

The seventh embodiment of the present invention is explained; it should be noted that those locations whose constitution is the same as in each of the aforementioned embodiments are denoted by the same symbols and not explained.

The bed with projector screen in this embodiment is characterized in that the floorboard 210 further has a third transparent part 212, as well as a second reflector mirror 260 placed under the floorboard 210 to reflect the light from a second projector P2' to transmit through the third transparent part 212 and project it onto the ceiling surface.

To be specific, the mechanism is such that, as shown in FIG. 32, the second reflector mirror 260 is placed in addition to the constitution in the first embodiment, and this second reflector mirror 260 is used to reflect the light from the second projector P2' upward to transmit through the third transparent part 212 in the floorboard 210 and project it onto the ceiling surface.

In this case, the user can experience large-screen viewing not only while lying face down, but also while lying face up.

It should be noted that, when all of the floorboard 210 is manufactured using a transparent material, the entire floorboard 210 represents both the first transparent part 211 and the third transparent part 212.

Eighth Embodiment

The eighth embodiment of the present invention is explained; it should be noted that those locations whose constitution is the same as in each of the aforementioned embodiments are denoted by the same symbols and not explained.

The bed with projector screen in this embodiment is characterized in that the floorboard is a flexible sheet-shaped member.

To be specific, as shown in FIG. 33, the four corners of the sheet-shaped floorboard 300 are fixed to the bed frame 202 using strings 301, etc.

If the floorboard is constituted by reinforced glass, etc., the floorboard may break due to the weight of the user; by adopting the sheet-shaped floorboard 300, however, the risk of breaking is eliminated and the bed can also be made lighter.

Ninth Embodiment

The ninth embodiment of the present invention is explained; it should be noted that those locations whose constitution is the same as in each of the aforementioned embodiments are denoted by the same symbols and not explained.

The bed with projector screen in this embodiment is characterized in that it has a cushion with projector screen.

To be specific, the bed with projector screen is constituted by placing a cushion with projector screen 302 on a bed deck 303, as shown in FIG. 34 (a). For the bed deck 303, any commercial product may be used. By placing the cushion with projector screen on the bed deck 303, its deflection and distortion can be reduced for viewing comfort.

It should be noted that square-framed outer skeleton parts 304 may be attached to the cushion with projector screen 302, as shown in FIG. 34 (b), or a shortened cushion with projector screen 305 may be used, with the remaining part fitted with a general cushion, mattress or other elastic member 306, as shown in FIG. 34 (c). Also, the transmission-type screen layer and first reflector mirror may be made flexible, in which case the transmission-type screen layer and first reflector mirror do not break easily even when the user U applies his or her weight thereon, resulting in greater safety.

INDUSTRIAL FIELD OF APPLICATION

The present invention relates to a cushion with projector screen, and a bed with projector screen, each allowing a user lying face down to view images from a projector on a large screen, and thus presents industrial applicability.

DESCRIPTION OF THE SYMBOLS

A, B Section
C Computer
L1 Light from the inside toward the outside of the cushion main body
L2 Stray light
P1 First projector
P1' First projector
P2 Second projector
P2' Second projector
P3 Projector
S Non-light-transmitting film
U User
X Third party
1 Cushion with projector screen
2 Cushion with projector screen
3 Cushion with projector screen
10 Cushion main body
11 Fluid
12 Inlet
13 Opening part
14 Transparent part
15 Slit
15a Slit
20 First transmission-type screen layer
21 Pocket
30 First reflector mirror
31 Second reflector mirror
40 Angle-adjustment mechanism
41 Connection part
42 Leg part
43 Backing material
44 Chain
45 Hook
46 String
47 Plug
47a Shaft part
47b Head part
48 O-ring or rubber gasket
49 Expansion part
49a Inlet
50 Anti-wrinkle means
51 Transparent sheet
52 Pocket
60 Outer skeleton part
70 Second transmission-type screen layer
71 Cushion material
72 String or bar
73 Convex part
74 Concave part
75 Film
100 Bed
101 Opening part
102 Bed frame
201 Bed with projector screen
202 Bed frame
203 Bracket
204 Guide frame
210 Floorboard
211 First transparent part
212 Third transparent part
220 Transmission-type screen layer
230 Mattress
231 Second transparent part
232 Inlet
233 Pocket
234 Separable part
235 Through hole
236a to 236d Other part
237 Separable part
237a Top part
237b Bottom part
240 First reflector mirror
241 Reflective surface
241a Frame
242 Connection part
242a Cylindrical member
242b Rotational shaft
243 Leg part
244 Slide-type metal fixture
245 Clamp mechanism
250 Film sheet, etc.
260 Second reflector mirror
300 Floorboard
301 String
302 Cushion with projector screen
303 Bed deck 304 Outer skeleton part
305 Cushion with projector screen
306 Elastic member

What is claimed is:

1. A cushion with projector screen, characterized by comprising at least: a cushion main body having a principal side capable of supporting a user lying face down thereon; a transmission-type screen layer placed at and attached to the principal side in a manner that a user can lie face down on the principal side and the transmission-type screen layer; and a reflector mirror that reflects a light projected from a first projector and projects it onto the transmission-type screen layer; wherein the reflector mirror represents a first reflector mirror placed inside the cushion main body below the transmission-type screen layer to reflect the light projected from the first projector and project it onto the transmission-type screen layer; wherein a user lying face down on the principal side of the cushion main body and the transmission-type screen layer can view images projected onto the transmission-type screen layer with his/her face facing down.

2. The cushion with projector screen, according to claim 1, characterized in that: the cushion main body is hollow and filled with air or light-transmissive fluid inside; the transmission-type screen layer represents a first transmission-type screen layer placed on the principal side of the cushion main body in a manner that a user can lie face down directly on the first transmission-type screen layer; the cushion main body has a transparent part that transmits the light from the first projector through; and a user lying face down on the cushion main body views the images projected onto the first transmission-type screen layer through the transparent part with his/her face facing down.

3. The cushion with projector screen according to claim 2, characterized in that it has an angle adjustment mechanism that changes an inclination angle of the first reflector mirror relative to a horizontal plane.

4. The cushion with projector screen according to claim 3, characterized in that:
the cushion main body is compressible and flexible, and
the first transmission-type screen layer and first reflector mirror are flexible; and
they can be rolled or folded.

5. The cushion with projector screen according to claim 3, characterized in that the cushion main body does not transmit light, except in the transparent part.

6. The cushion with projector screen according to claim 3, characterized in that the first reflector mirror can be taken out from an inside of the cushion main body to an outside.

7. The cushion with projector screen according to claim 2, characterized in that:
the cushion main body is compressible and flexible, and
the first transmission-type screen layer and first reflector mirror are flexible; and
they can be rolled or folded.

8. The cushion with projector screen according to claim 2, characterized in that the cushion main body does not transmit light, except in the transparent part.

9. The cushion with projector screen according to claim 2, characterized in that the first reflector mirror can be taken out from an inside of the cushion main body to an outside.

10. The cushion with projector screen according to claim 9, characterized in that it has an anti-wrinkle means for preventing the first transmission-type screen layer from wrinkling.

11. The cushion with projector screen according to claim 9, characterized in that it has one or two or more second transmission-type screen layers extending in a vertical direction from the top part of the cushion main body.

12. The cushion with projector screen according to claim 9, characterized in that it has outer skeletal parts enclosing a periphery of the cushion main body.

13. The cushion with projector screen claim 9, characterized in that it has a second reflector mirror placed inside the cushion main body below the first transmission-type screen layer to reflect a light projected from a second projector and project it onto the first transmission-type screen layer.

14. A bed with projector screen, characterized by being equipped with the cushion with projector screen according to claim 9.

* * * * *

UNITED STATES PATENT AND TRADEMARK OFFICE
CERTIFICATE OF CORRECTION

PATENT NO.         : 11,045,009 B2
APPLICATION NO.    : 16/068335
DATED              : June 29, 2021
INVENTOR(S)        : Makoto Nishida It is certified that error appears in the above-identified patent and that said Letters Patent is hereby corrected as shown below:

In the Claims

Column 19, Line 6, in Claim 1, after the (":"), the phrase beginning with "a cushion main body" should be started as a new line.

Column 19, Line 8, in Claim 1, after the (";"), the phrase beginning with "a transmission-type screen layer" should be started as a new line.

Column 19, Line 11, in Claim 1, after the word "and", the phrase beginning with "a reflector mirror" should be started as a new line.

Column 19, Line 13, in Claim 1, after the (";"), the phrase beginning with "wherein the reflector mirror" should be started as a new line.

Column 19, Line 17, in Claim 1, after the (";"), the phrase beginning with "wherein a user" should be started as a new line.

Column 19, Line 23, in Claim 2, after the (":"), the phrase beginning with "the cushion main body" should be started as a new line.

Column 19, Line 24, in Claim 2, after the (";"), the phrase beginning with "the transmission-type screen layer" should be started as a new line.

Column 19, Line 28, in Claim 2, after the (";"), the phrase beginning with "the cushion main body" should be started as a new line.

Column 19, Line 30, in Claim 2, after the word "and", the phrase beginning with "a user" should be started as a new line.

Column 20, Line 20, in Claim 10, "claim 9" should be --claim 2--.

<div style="text-align:center">
Signed and Sealed this<br>
Twenty-fourth Day of August, 2021
</div>

Drew Hirshfeld
*Performing the Functions and Duties of the*
*Under Secretary of Commerce for Intellectual Property and*
*Director of the United States Patent and Trademark Office*

Column 20, Line 24, in Claim 11, "claim 9" should be --claim 2--.

Column 20, Line 28, in Claim 12, "claim 9" should be --claim 2--.

Column 20, Line 30, in Claim 13, "claim 9" should be --claim 2--.

Column 20, Line 37, in Claim 14, "claim 9" should be --claim 2--.